United States Patent
Wang et al.

(10) Patent No.: US 11,937,323 B2
(45) Date of Patent: Mar. 19, 2024

(54) FACILITATING SELF-ORGANIZING NETWORK (SON) ENHANCEMENT

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 457 days.

(21) Appl. No.: 17/311,986

(22) PCT Filed: Dec. 11, 2019

(86) PCT No.: PCT/US2019/065703
§ 371 (c)(1),
(2) Date: Jun. 8, 2021

(87) PCT Pub. No.: WO2020/123633
PCT Pub. Date: Jun. 18, 2020

(65) Prior Publication Data
US 2022/0007451 A1  Jan. 6, 2022

Related U.S. Application Data

(60) Provisional application No. 62/850,269, filed on May 20, 2019, provisional application No. 62/778,889, filed on Dec. 12, 2018.

(51) Int. Cl.
*H04W 4/00* (2018.01)
*H04L 5/00* (2006.01)
(Continued)

(52) U.S. Cl.
CPC ........... *H04W 76/25* (2018.02); *H04L 5/0055* (2013.01); *H04W 24/04* (2013.01); *H04W 76/15* (2018.02); *H04W 84/18* (2013.01)

(58) Field of Classification Search
CPC ..... H04W 76/25; H04W 24/04; H04W 76/15; H04W 84/18; H04W 24/10; H04W 24/02; H04L 5/0055
(Continued)

(56) References Cited

U.S. PATENT DOCUMENTS 9,107,187 B2 *  8/2015  Chow ................. H04W 28/021
9,173,150 B2 * 10/2015  Siomina ................ H04W 36/38
(Continued)

FOREIGN PATENT DOCUMENTS

CN  102017540  4/2011
JP  5628933  11/2014
(Continued)

OTHER PUBLICATIONS

"Foreign Office Action", EP Application No. 19832798.3, dated Apr. 3, 2023, 9 pages.
(Continued)

*Primary Examiner* — Amancio Gonzalez
(74) *Attorney, Agent, or Firm* — Colby Nipper PLLC

(57) ABSTRACT

Wireless networks may have thousands of configurable parameters, so manual tuning is infeasible. A self-organizing network (SON) can provide automation. However, automated algorithms are not designed to interact with a wireless network, and network experimentation can jeopardize reliability. To address the former, a SON facilitator of a wireless network management node exposes an API that can translate network configuration information for consumption by a SON enhancer, which may implement an AI algorithm for network tuning. The SON facilitator can also transform output from the SON enhancer into directions for controlling a test scenario, including generating a DL SON message describing the test to a UE. To further increase reliability during the test scenario, the UE can be provisioned with two
(Continued)

wireless connections. A first connection is unchanged by the test scenario for stability, and a second connection is used for testing.

20 Claims, 12 Drawing Sheets

(51) Int. Cl.
*H04W 24/04* (2009.01)
*H04W 76/15* (2018.01)
*H04W 76/25* (2018.01)
*H04W 84/18* (2009.01)

(58) Field of Classification Search
USPC .......................................................... 370/328
See application file for complete search history.

(56) References Cited

U.S. PATENT DOCUMENTS

| | | | |
|---|---|---|---|
| 9,414,248 B2* | 8/2016 | Kovvali | H04L 41/5009 |
| 9,867,112 B1 | 1/2018 | Schwengler et al. | |
| 10,218,422 B2 | 2/2019 | Raghavan et al. | |
| 10,432,375 B1* | 10/2019 | Kang | H04W 72/52 |
| 2011/0158117 A1 | 6/2011 | Ho et al. | |
| 2011/0244805 A1 | 10/2011 | Wu | |
| 2012/0287800 A1* | 11/2012 | Siomina | H04W 64/003 |
| | | | 370/252 |
| 2013/0329563 A1* | 12/2013 | Song | H04J 3/14 |
| | | | 370/241 |
| 2014/0192740 A1 | 7/2014 | Ekpenyong et al. | |
| 2015/0092651 A1* | 4/2015 | Chow | H04B 10/25752 |
| | | | 370/312 |
| 2015/0195795 A1 | 7/2015 | Loehr et al. | |
| 2015/0208264 A1* | 7/2015 | Koskinen | H04W 24/10 |
| | | | 455/67.11 |
| 2016/0323832 A1 | 11/2016 | Love et al. | |
| 2017/0026865 A1 | 1/2017 | Behravan et al. | |
| 2017/0070902 A1 | 3/2017 | Fukuta | |
| 2017/0331577 A1 | 11/2017 | Parkvall et al. | |
| 2017/0367028 A1 | 12/2017 | Gormley et al. | |
| 2019/0081657 A1 | 3/2019 | Zeng et al. | |
| 2019/0150005 A1 | 5/2019 | Cendrillon | |
| 2020/0154442 A1 | 5/2020 | Zhou | |

FOREIGN PATENT DOCUMENTS

| | | |
|---|---|---|
| WO | 2007082035 | 7/2007 |
| WO | 2018130115 | 7/2018 |
| WO | 2018203306 | 11/2018 |
| WO | 2020123633 | 6/2020 |

OTHER PUBLICATIONS

"International Preliminary Report on Patentability", Application No. PCT/US2019/065703, dated Jun. 8, 2021, 10 pages.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.4.0, Dec. 2018, 67 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.0, Mar. 2019, 948 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, 933 pages.

"International Search Report and Written Opinion", PCT Application No. PCT/US2019/065703, dated Mar. 13, 2020, 16 pages.

"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.

"UE Overheating for EN-DC", 3GPP R2-1802414, UE overheating for EN-DC, in 3GPP TSG-RAN WG2 Meeting #101, Apple Inc., Mar. 2, 2018, 3 pages.

"Universal Mobile Telecommunications System (UMTS); LTE; 5G; NR; Multi-connectivity; Overall description; Stage-2 (3GPP TS 37.340 version 15.5.0 Release 15)", ETSI TS 137 340 v15.5.0, May 2019, 70 pages.

Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.

Kumar, "A Survey of Self-Organizing Networks", http://www.cse.wustl.edu/~jain/cse574-16/ftp/son/index.html, Apr. 17, 2016, 16 pages.

Moysen, et al., Department of Signal and Theory Communications, Universitat Polit'ecnica de Catalunya—UPC Communications Network Division, Centre Tecnol 'ogic de Telecomunicaciones de Catalunya—CTTC, Jan. 16, 2018, 23 pages.

Wu, "Handling Overheating in a Wireless-Communication Device", Technical Disclosure Commons; Retrieved from https://www.tdcommons.org/dpubs_series/2343, Jul. 12, 2019, 22 pages.

"Foreign Office Action", AU Application No. 2019396444, dated Feb. 15, 2022, 3 pages.

\* cited by examiner

FACILITATING SELF-ORGANIZING NETWORK (SON) ENHANCEMENT

RELATED APPLICATION(S)

This application is a national stage entry of International Application No. PCT/US2019/065703, filed Dec. 11, 2019, which claims the benefit of U.S. Provisional Application No. 62/850,269, filed May 20, 2019, and U.S. Provisional Application No. 62/778,889, filed Dec. 12, 2018, the disclosures of which are incorporated herein by reference in their entirety.

BACKGROUND

With cellular communications technology, a communication between two endpoints usually has both a wireless portion and a wired portion. A portion of the communication that is near one party at one endpoint (e.g., a wireless device or "smartphone") is instituted using a wireless connection between the wireless device and a base station, which is part of a cellular or other radio access network of a larger communication network. This wireless connection typically extends from a few feet to a few miles. The communication network also includes or is coupled to a wired network. The base station can therefore continue or forward the communication as a wired portion using a wired connection over the wired network. The wired network can extend from dozens of feet to thousands of miles. If the other party at another endpoint of the communication is also using a mobile phone, the communication can be converted back to another wireless portion and routed to the other party using another wireless connection.

To provide voice, image, video, text, and other services, wireless networks are already expected to handle immense quantities of data with little to no appreciable delays. However, newer services are primed to demand even more from cellular and other wireless networks. Users will expect greater data bandwidth and even less delay, which is called latency, to accommodate such services. These new services include high-bandwidth applications like ultra-high definition (UHD) video that is delivered wirelessly from a streaming video service to a mobile device. Such services also include low-latency applications like autonomous-driving vehicles that communicate with each other to avoid accidents and that can therefore operate more safely if provided nearly instantaneous data communication capabilities. Some applications, like virtual reality (VR), will demand data delivery that provides a combination of both high-bandwidth and low-latency. Further, there is the ongoing development of the Internet of Things (IoT), which involves providing wireless communication capabilities to everything from medical devices to security hardware, from refrigerators to speakers, and to nearly ubiquitous sensors designed for safety and convenience. The deployment of IoT devices means hundreds of billions to trillions of new devices will soon be trying to communicate wirelessly.

Current 4G wireless networks are not expected to handle the data bandwidth and latency targets for these new applications, or the sheer number of new devices. Accordingly, to enjoy these new applications, new wireless technology is being developed. For example, Fifth Generation (5G) wireless network technology will adopt higher frequency electromagnetic (EM) waves (e.g., 6 GHz to 300 GHz for millimeter wave (mmW) wireless connections) to attain higher data bandwidth in conjunction with lower latency. These new applications and higher EM frequencies, however, introduce new and different challenges that are yet to be overcome by current wireless technologies.

For example, with the multitude of IoT devices that are coming on-line, the EM spectrum that is allocated to cellular wireless usage will be shared among many more wireless connection endpoints. Also, the mmW EM signals that will be used in some wireless networks, including 5G cellular networks, attenuate more quickly than EM signals using lower-frequency bands. More specifically, mmW EM signals are attenuated more quickly by air molecules and other environmental factors, such as humidity or physical obstructions, as compared to those signaling frequencies used in earlier generations of wireless networks. Consequently, mmW EM signals are incapable of traveling as far through the atmosphere before their quality is reduced to a level at which the information in the wireless signal is lost or otherwise becomes unusable. To address these issues, engineers and manufacturers are striving to create new wireless network technologies that can enable utilization of these higher GHz frequencies while supporting many additional wireless devices in a cellular or other wireless network, including those operating in accordance with a 5G wireless network standard.

This background description is provided to generally present the context of the disclosure. Unless otherwise indicated herein, material described in this section is neither expressly nor impliedly admitted to be prior art to the present disclosure or the appended claims.

SUMMARY

This summary is provided to introduce simplified concepts of facilitating self-organizing network (SON) enhancement. The simplified concepts are further described below in the Detailed Description. Accordingly, this summary is not intended to identify essential features of the claimed subject matter nor is it intended for use in determining the scope of the claimed subject matter.

Methods and apparatuses for facilitating SON enhancement are described. Technology incorporated into a user equipment (UE) or a wireless network node enables a network enhancement mechanism to increase network performance in an automated manner With each new generation of cellular standards, the corresponding cellular network becomes more complex. Newer UEs may be capable of maintaining two or more wireless connections simultaneously with a wireless network. Further, new cellular networks are expected to service an ever-increasing number of wireless device endpoints while juggling a myriad of different network settings, such as carrier frequencies, timer lengths, power levels, antenna directions, and so forth. Consequently, a wireless network may have thousands of configurable parameters, such as radio access or radio network parameters, which may be affected by hundreds of changing usage and environmental factors. As a result, manual adjustment of these parameters to improve network performance and accommodate the changing factors is infeasible.

To account for these issues, in example implementations, a wireless network liaison interacts with a network enhancement mechanism. Additionally or alternatively, a UE's ability to maintain multiple wireless connections is leveraged to safely test alternative network configurations in pursuit of network enhancement. A SON enhancement mechanism, such as a server having an artificial intelligence (AI) functionality, can process a current network configuration and generate an alternative network configuration to be used in a test scenario. The AI functionality can, for instance, implement an iterative refinement technique such as A/B testing over time. A wireless network SON liaison, such as a wireless network management node having SON network functionality, realizes an application programming interface (API) to interact with the SON enhancement mechanism. The SON liaison transforms the alternative network configuration into a transformed network configuration based on wireless network constraints that are unknown to the SON enhancement mechanism or to accommodate wireless network signaling protocols.

For example, the SON liaison can perform the transformation based on the availability of multiple wireless connections per UE and responsive to an associated quality of service (QoS) for each UE. In some cases, a first wireless connection can be stabilized for use with a given QoS while a second wireless connection can be adjusted as part of a test scenario for the alternative network configuration. In other cases, a first wireless connection can be established based on a known wireless connection configuration that is unchanged by a test scenario, and a second wireless connection can be established using at least one radio access network parameter configured in accordance with the test scenario. The SON liaison can also directly or indirectly generate, for each UE, a downlink (DL) SON message that describes the test scenario and specifies how the UE is to handle execution of the test scenario. The test scenario description can include, for instance, an assigned timeframe for executing the test and a termination configuration, which includes radio access or radio network configuration settings, that the UE is to adopt at a conclusion of the timeframe. In these manners, an automated enhancement mechanism can be applied to facilitate SON operations while certain network expectations, such as a contracted-for QoS, are achieved using multiple wireless connections with a UE.

Aspects described below include a user equipment (UE) for facilitating self-organizing network (SON) enhancement. The UE includes at least one antenna, at least one wireless transceiver coupled to the at least one antenna, and a processor and memory system. The processor and memory system are coupled to the at least one wireless transceiver and implement a SON facilitator. The SON facilitator is configured to receive, from a wireless network, a downlink (DL) SON message, with the DL SON message indicative of a test scenario and specifying at least one radio access network parameter configured in accordance with the test scenario. The SON facilitator is also configured to instruct the at least one wireless transceiver to communicate with at least one base station using at least a first wireless connection and a second wireless connection. The first wireless connection is to be unchanged by the test scenario, and the second wireless connection is to use the at least one radio access network parameter.

Aspects described below include a base station for facilitating self-organizing network (SON) enhancement. The base station includes multiple antennas, multiple wireless transceivers coupled to the multiple antennas, and a processor and memory system. The processor and memory system is coupled to the multiple wireless transceivers and implements a SON facilitator. The SON facilitator is configured to transmit, to at least one user equipment (UE), a downlink (DL) SON message, with the DL SON message indicative of a test scenario and specifying at least one radio access network parameter configured in accordance with the test scenario. The SON facilitator is also configured to instruct at least one wireless transceiver of the multiple wireless transceivers to communicate with the at least one UE using at least a first wireless connection and a second wireless connection. The first wireless connection is to be unchanged by the test scenario, and the second wireless connection is to use the at least one radio access network parameter.

Aspects described below include a method performed by a user equipment (UE) for facilitating self-organizing network (SON) enhancement. The method includes receiving, from a wireless network, a downlink (DL) SON message, with the DL SON message indicative of a test scenario and specifying at least one radio access network parameter configured in accordance with the test scenario. The method also includes communicating, using at least one wireless transceiver, with at least one base station using a first wireless connection, with the first wireless connection to be unchanged by the test scenario. The method further includes communicating with the at least one base station using a second wireless connection using the at least one radio access network parameter.

Aspects described below include a method performed by a base station for facilitating self-organizing network (SON) enhancement. The method includes transmitting, to at least one user equipment (UE), a downlink (DL) SON message, with the DL SON message indicative of a test scenario and specifying at least one radio access network parameter configured in accordance with the test scenario. The method also includes communicating, using one or more wireless transceivers, with the at least one UE using a first wireless connection, with the first wireless connection to be unchanged by the test scenario. The method further includes communicating with the at least one UE using a second wireless connection using the at least one radio access network parameter.

Aspects described below include a system for facilitating self-organizing network (SON) enhancement. The system includes at least one core network interface coupled to a core network of a wireless network. The system also includes a processor and memory system coupled to the at least one core network interface to communicate with the wireless network and implement a SON facilitator. The SON facilitator is configured to collect configuration information for at least a portion of the wireless network. The SON facilitator is also configured to obtain, for a test scenario, alternative configuration information that is based on the configuration information. The SON facilitator is further configured to process the alternative configuration information using at least one current network condition for a user equipment (UE) to produce transformed alternative configuration information, with the transformed alternative configuration information comprising a provision for the UE including at least a first wireless connection and a second wireless connection. The first wireless connection is to be unchanged by the test scenario, and the second wireless connection is to be configured in accordance with the alternative configuration information for the test scenario.

Aspects described below further include a system that may be realized as at least part of a user equipment (UE). The system includes means for facilitating self-organizing network (SON) enhancement at the UE. The means for facilitating SON enhancement is configured to receive, from a wireless network, a downlink (DL) SON message, with the DL SON message indicative of a test scenario and specifying at least one radio access network parameter configured in accordance with the test scenario. The means for facilitating SON enhancement is also configured to instruct the at least one wireless transceiver to communicate with at least one base station using at least a first wireless connection and a second wireless connection. Here, the first wireless connection is to be unchanged by the test scenario, and the second wireless connection is to use the at least one radio access network parameter.

BRIEF DESCRIPTION OF THE DRAWINGS

Apparatuses of and techniques for facilitating self-organizing network (SON) enhancement are described with reference to the following drawings. The same numbers are used throughout the drawings to reference like features and components.

DETAILED DESCRIPTION

Overview

Figure 1:
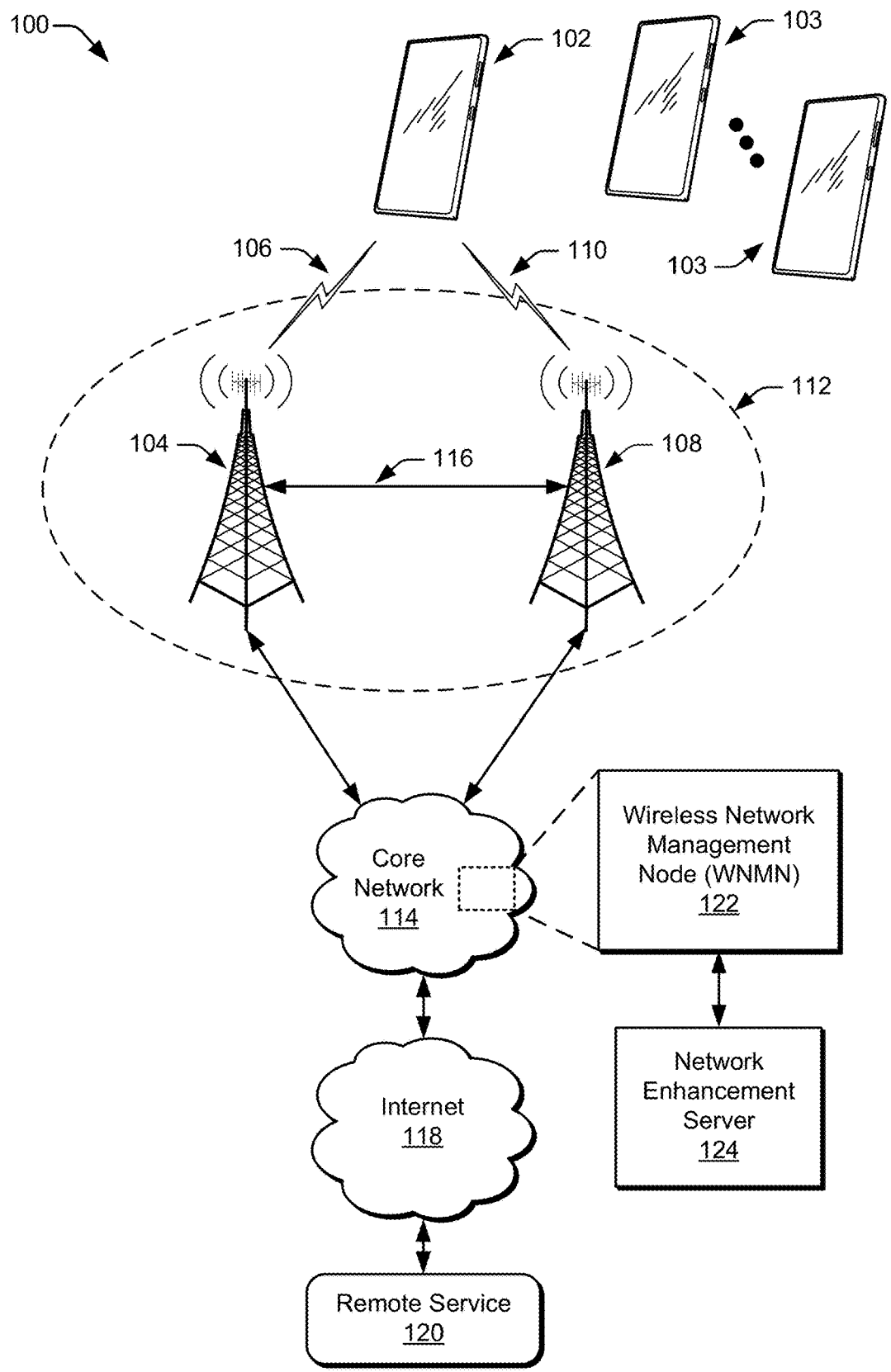
FIG. 1 illustrates an example wireless network environment in which different devices interoperate and can implement the facilitation of SON enhancement.

Today, users can watch HD video, monitor social-network feeds, and participate in video conferences using cellular wireless networks that operate in accordance with a 4G standard, such as LTE or LTE-Advanced. Soon, cellular wireless networks will be asked to handle newer applications that are technologically more difficult to provide to end users. Such applications may include watching ultra-HD (UHD) video or wirelessly coupling hundreds of billions more communication endpoints to the internet to support Internet-of-Things (IoT) devices. Such applications may also entail providing a safer sharing of the roadways by empowering self-driving vehicles or exchanging three-dimensional (3D) virtual reality (VR) data for games, professional training, and educational activities. To enable these newer applications, current cellular wireless networks are expected to be upgraded from 4G technology.

To upgrade from current 4G wireless networks, various goals have been established for next-generation 5G networks. These goals involve adopting higher electromagnetic (EM) frequencies for wireless signaling in 5G networks than are used in 4G networks. For example, instead of only operating in the 100s of MHz to a few GHz like in 4G networks, 5G networks are expected to also operate in the 10s of GHz (e.g., from 6 GHz to 300 GHz for mmW signaling). These higher frequencies offer some advantages, such as the potential for greater communication bandwidth in conjunction with lower latency. However, there are many challenges to working with these higher frequencies, and the increase in numbers of wireless devices will further tax wireless network resources.

Unfortunately, addressing these challenges will result in wireless networks with more "moving parts" and a multitude of "adjustable dials," metaphorically speaking. For example, next-generation networks may employ beamforming in which antennas "aim" signal beams, carrier aggregation, micro-cells such that more base stations are obligated to interoperate in proximity with one another, diverse coding schemes, transmit power changes, different orthogonal frequency-division multiplexing (OFDM) numerologies, and so forth. Each of these aspects can be individually controlled. Consequently, wireless networks are becoming increasingly more complicated to configure.

To support these increasingly complicated wireless networks, wireless cellular networks are specified by tens of thousands of pages of specifications, with thousands of configurable parameters. As a result, there are far more parameters that can be optimized than can be practically configured using a manual approach. In contrast, an automated approach may involve utilizing self-organizing networks (SON) or minimization of drive tests (MDT). For example, deep learning, reinforcement learning, neural networks, or other machine learning and artificial intelligence (AI) technologies may be able to autonomously configure and enhance operation of wireless networks.

However, there are several issues with trying to employ an automated enhancement mechanism with a wireless network. First, existing AI mechanisms are not designed to account in real-time for the fluctuating operational and environmental factors that can impact wireless network performance. Second, existing AI mechanisms are not built to communicate using signaling protocols dictated by wireless standard specifications. Third, AI mechanisms are not aware of some transient network obligations, such as quality-of-service (QoS) guarantees. Thus, additional support from a wireless network can be provided to enable network enhancement using an AI algorithm while also meeting network obligations, such by enabling network configuration A/B testing while meeting QoS guarantees.

To do so, a liaison to an automated enhancement mechanism is provided by a wireless network, and/or multiple wireless connections can be established between a given UE and the wireless network for experimental testing, which are termed test scenarios herein. Generally, the automated enhancement mechanism can create a test scenario with an alternative network configuration that is implemented by the wireless network using the liaison. To ensure that QoS guarantees are met during execution of the test scenario, the liaison maintains at least one wireless connection to a given UE that is not changed by the test scenario even while another wireless connection may be changed as a result of the test scenario.

The liaison can be implemented by a wireless network management node (WNMN) that realizes an application programming interface (API). The API provides an interface between the automated enhancement mechanism and functionality of the wireless network core. A self-organizing network (SON) facilitator at the wireless network management node (WNMN) processes current configuration information for the wireless network to produce translated configuration information. The translated configuration information is adapted for input to and processing by a SON enhancer at a network enhancement server. The SON enhancer can implement, for example, an iterative refinement technique that utilizes a guided trial and error scheme to gradually enhance performance of the wireless network. Using an AI algorithm and based on the translated configuration information, the SON enhancer can produce a test scenario that is specified by alternative configuration information. The test scenario can change, for instance, network load or scheduling information, antenna direction, UL/DL configuration, and so forth.

The SON facilitator accepts the alternative configuration information from the SON enhancer and produces transformed alternative configuration information based on network signaling protocols and responsive to current network obligations. For example, if a given UE is associated with a certain QoS, the SON facilitator at the wireless network management node (WNMN) can provision multiple wireless connections for the given UE. Thus, the given UE may be provided a first wireless connection and a second wireless connection. During execution of the test scenario, the first wireless connection is unchanged such that the QoS obligation can be met regardless of how the alternative network configuration affects the second wireless connection. The SON facilitator at the wireless network management node (WNMN) can also generate a DL SON message for the UE that describes the test scenario from the perspective of the UE (e.g., how it will or may affect the UE).

To support the test scenario at the UE, the UE also includes a SON facilitator. The UE receives the DL SON message, and the SON facilitator thereof processes the DL SON message. The DL SON message describes the test scenario. This description can include, for example, a timeframe (e.g., a start time or an end time) over which the test scenario is to occur. The description can also indicate a termination configuration, which includes radio access or ratio network configuration settings, to be enacted at the conclusion of the timeframe. This termination configuration for the UE can correspond to a reversion to the previous configuration or another different configuration. Including a termination configuration can enable the UE to recover if the alternative configuration breaks a wireless connection of the UE or a wired connection within the core network leading to the wireless connection of the UE. The DL SON message can also specify at least a second wireless connection if the UE does not already have multiple wireless connections. In response to the DL SON message, the UE can utilize the multiple wireless connections and transmit a responsive UL SON message that acknowledges participation in the test scenario. The UE can also collect performance or other measurement data during the test scenario and send this measurement data to the SON facilitator.

In these manners, an automated enhancement mechanism can interface with a wireless network to enable the network to be self-organized and enhanced over time. Further, a wireless network can meet QoS obligations using multiple wireless connections with a given UE, with the wireless connections being established such that a test scenario created by the automated enhancement mechanism can be safely executed by the wireless network and the given UE.

Example implementations in various levels of detail are discussed below with reference to the associated figures. The discussion below first sets forth an example operating environment and then describes example schemes, techniques, and hardware. Example methods are described thereafter with reference to various flow diagrams.

Example Environment

FIG. 1 illustrates an example environment 100, which includes at least one user equipment 102 (UE 102) that communicates with a base station 104 that acts as a serving cell (serving base station 104) through a wireless communication link 106 (wireless link 106). In this example, the user equipment 102 and other user equipments 103 are depicted as respective smartphones. Although illustrated as smartphones, any of the user equipments 102 and 103 may be implemented as any suitable computing or electronic device, such as a mobile communication device, modem, cellular or mobile phone, mobile station, gaming device, navigation device, media or entertainment device, laptop computer, desktop computer, tablet computer, smart appliance, vehicle-based communication system, wearable computer, Internet of Things (IoTs) device, wireless interface for a machine, and the like. The base station 104 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base station 104 communicates with the user equipment 102 using the wireless link 106, which may be implemented as any suitable type of wireless link. The wireless link 106 can include a downlink (DL) of data and control information communicated from the base station 104 to the user equipment 102, an uplink (UL) of other data and control information communicated from the user equipment 102 to the base station 104, or both. The wireless link 106 may include one or more wireless links or bearers implemented using any suitable communication protocol or standard, or combination of communication protocols or standards, such as 3rd Generation Partnership Project Long-Term Evolution (3GPP LTE), Fifth Generation New Radio (5G NR), and so forth.

In some aspects, the user equipment 102 communicates with another base station 104 (a neighbor base station 108) using a wireless link 110. The wireless link 110 may be implemented using the same communication protocol or standard as, or a different communication protocol or standard than, that of the wireless link 106. For example, the wireless link 106 can be implemented as a 5G NR link while the wireless link 110 is implemented as an LTE link. The base station 104, the neighbor base station 108, and any additional base stations (not illustrated for clarity) collectively form a Radio Access Network 112 (e.g., RAN 112, Evolved Universal Terrestrial Radio Access Network 112, E-UTRAN 112, or the like), which is connected using a core network 114 (e.g., an Evolved Packet Core (EPC) network 114, a 5G core network 114, or the like) to realize a wireless operator network. The base station 104 and the neighbor base station 108 can communicate using an Xn Application Protocol (XnAP), as indicated at 116, to exchange user-plane and control-plane data. Using the Radio Access Network 112, the user equipment 102 may connect, using the core network 114, to one or more public networks, such as the Internet 118, or another packet data network, to interact with a remote service 120.

In example implementations, the environment 100 also includes a wireless network management node 122 (WNMN 122). The wireless network management node 122 provides coordination and control over two or more nodes of the core network 114 or the base stations 104/108 of the Radio Access Network 112. The wireless network management node 122 is depicted as being part of the core network 114. However, the wireless network management node 122 may alternatively be located at least partially outside of the core network 114, such as by being part of the internet 118. The wireless network management node 122 can be co-located with other network functionality (NF), disposed at a single physical location (e.g., at one server computer), distributed across multiple locations (e.g., spread across geographically-separated cloud computing infrastructure), some combination thereof, and so forth. Example aspects of the wireless network management node 122 are described below with reference to FIG. 3. As described below, the wireless network management node 122 can act as a liaison between a network enhancement server 124 and the core network 114.

The network enhancement server 124 provides SON services to the core network 114, and devices coupled thereto, using AI or other at least partly-autonomous analytical tools. To do so, the network enhancement server 124 is in communication with the wireless network management node 122. The network enhancement server 124 can be implemented in the internet 118, as part of the core network 114, separate from or co-located with the wireless network management node 122, some combination thereof, and so forth. In operation, the network enhancement server 124 can provide alternative network configurations for different test scenarios using an application programming interface (API) (not shown in FIG. 1) instantiated by the wireless network management node 122.

In some implementations for facilitating SON enhancement, the network enhancement server 124 configures at least one radio network parameter as part of a test scenario that can involve, for example, the core network 114, the Radio Access Network 112, and/or one or more user equipments 102 and 103 as described herein. One or multiple user equipments 102 (including other user equipments 103) can participate individually or jointly in a given test scenario. A given test scenario can therefore simultaneously involve one or more user equipments 102 (including other user equipments 103) that are in communication with the Radio Access Network 112 corresponding to each of one or more cells of a wireless network. Thus, a test scenario may include reconfiguring one user equipment, multiple user equipments, or all user equipments that are wirelessly connected to a base station 104.

Example Wireless Devices

Figure 2:
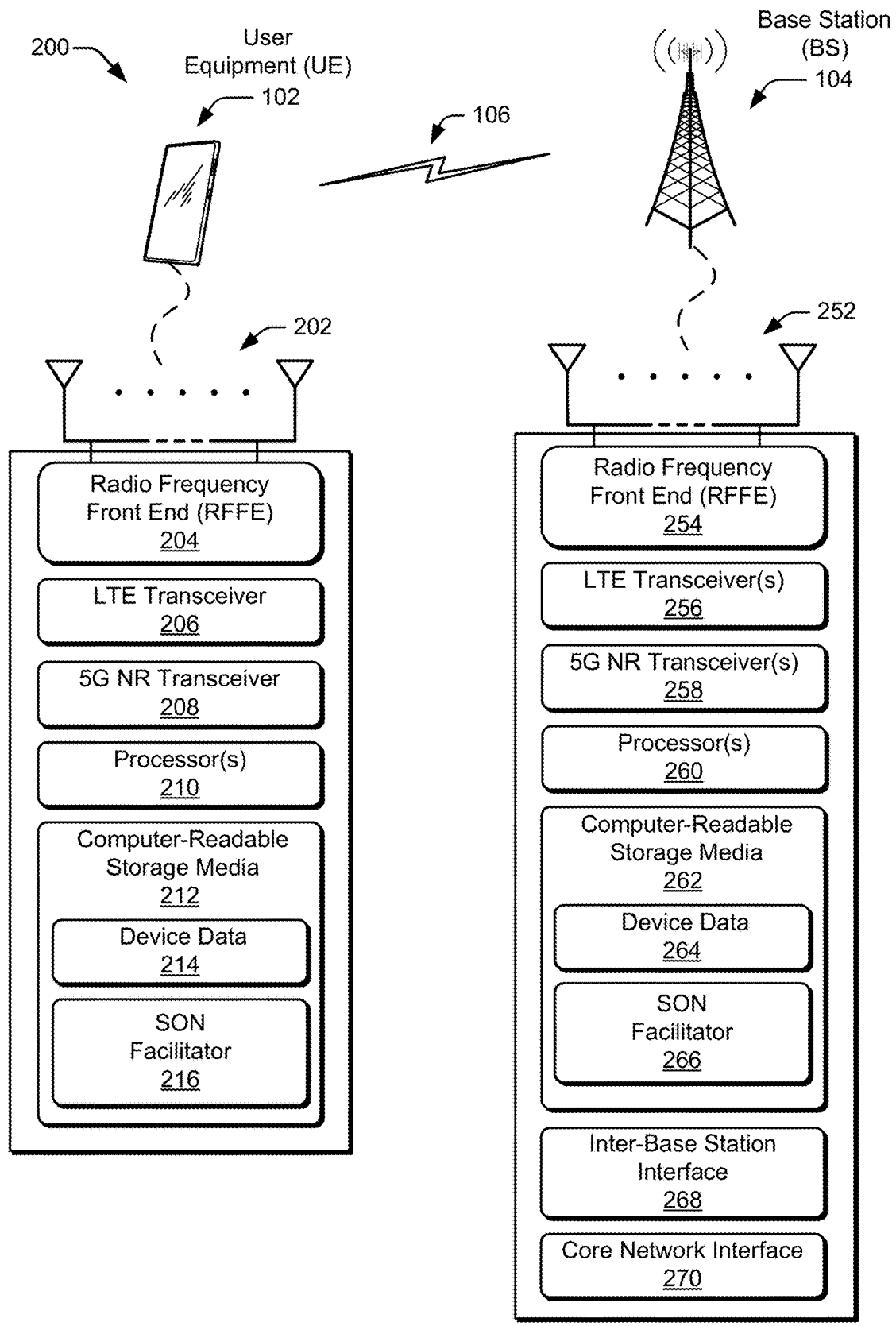
FIG. 2 is a schematic diagram illustrating example devices, such as a user equipment (UE) and a base station (BS), that can implement various aspects of facilitating SON enhancement with a wireless network.

FIG. 2 is a diagram 200 illustrating example wireless devices, such as a user equipment (UE) 102 and a base station (BS) 104. The UE 102 and the base station 104 may include additional functions and interfaces that are omitted from FIG. 2 for the sake of clarity. The UE 102 includes antennas 202, at least one radio frequency front end 204 (RF front end 204), at least one LTE transceiver 206, and at least one 5G NR transceiver 208 for communicating with the base station 104. The RF front end 204 of the UE 102 can couple or connect the LTE transceiver 206 and the 5G NR transceiver 208 to the antennas 202 to facilitate various types of wireless communication. The antennas 202 of the UE 102 may include an array of multiple antennas that are configured similar to or differently from each other. The antennas 202 and the RF front end 204 can be tuned to, and/or be tunable to, one or more frequency bands defined by the 3GPP LTE or the 5G NR communication standards and implemented by the LTE transceiver 206 or the 5G NR transceiver 208, respectively. Additionally, the antennas 202, the RF front end 204, the LTE transceiver 206, and/or the 5G NR transceiver 208 may be configured to support beamforming for the transmission and reception of communications with the base station 104 and/or to enable multiple wireless connections to be at least substantially simultaneously established between the UE 102 and the base station 104. For instance, two wireless connections can be established using two different wireless transceivers that can be operated at a same time, or two wireless connections can be established using a single wireless transceiver that is operated in a time-division duplex (TDD) manner, such as interleaving their usage every other radio frame. Thus, the UE 102 can include multiple transceivers 206/208, such as at least one transceiver per simultaneous wireless connection. Example wireless connections between the UE 102 and the base station 104 are described below with reference to FIG. 3. By way of example and not limitation, the antennas 202 and the RF front end 204 can be implemented for operation in sub-gigahertz bands, sub-6 GHZ bands, and/or above-6 GHz bands that are defined by the 3GPP LTE and 5G NR communication standards.

The UE 102 also includes one or more processors 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. The CRM 212 may include any suitable memory or storage device, such as random-access memory (RAM), static RAM (SRAM), dynamic RAM (DRAM), non-volatile RAM (NVRAM), read-only memory (ROM), or Flash memory, useable to store device data 214 of the UE 102. The device data 214 includes user data, multimedia data, beamforming codebooks, applications, and/or an operating system of the UE 102. Applications (not explicitly shown) and the device data 214 are executable by the processor(s) 210 to enable user-plane communication, control-plane signaling, and user interaction with the UE 102.

The CRM 212 also includes a SON facilitator 216. Alternately or additionally, the SON facilitator 216 may be implemented in whole or part as hardware logic or circuitry integrated with or separate from other components of the UE 102. In at least some aspects, the SON facilitator 216 configures the RF front end 204, the LTE transceiver 206, and/or the 5G NR transceiver 208 to implement the techniques for facilitating SON enhancement as described herein with regard to UEs, possibly in conjunction with other components, such as a communications processor or modem. For example, the SON facilitator 216 can handle DL SON messages, UL SON messages, and activities to participate in a test scenario, including those relating to starting or terminating a test scenario.

The base station 104, as shown in FIG. 2, can correspond to any of the example types of base stations set forth above or an equivalent thereof. The functionality of the base station 104 may be distributed across multiple network nodes or devices and may be distributed in any fashion suitable to perform the functions described herein. The base station 104 include antennas 252, at least one radio frequency front end 254 (RF front end 254), one or more LTE transceivers 256, and/or one or more 5G NR transceivers 258 for communicating with the UE 102. The RF front end 254 of the base station 104 can couple or connect the LTE transceivers 256 and the 5G NR transceivers 258 to the antennas 252 to facilitate various types of wireless communication. The antennas 252 of the base station 104 may include an array of multiple antennas that are configured similar to or differently from each other. The antennas 252 and the RF front end 254 can be tuned to, and/or be tunable to, one or more frequency bands defined by the 3GPP LTE and 5G NR communication standards and implemented by the LTE transceivers 256 and the 5G NR transceivers 258, respectively. Additionally, the antennas 252, the RF front end 254, the LTE transceivers 256, and/or the 5G NR transceivers 258 may be configured to support beamforming, such as massive multiple-input multiple-output (e.g., Massive-MIMO), for the transmission and reception of communications with the UE 102 or multiple UEs and may be configured to support test scenarios created by the network enhancement server 124 (e.g., of FIG. 1) and prepared for implementation by the wireless network management node 122.

The base station 104 also includes one or more processors 260 and computer-readable storage media 262 (CRM 262). The processor 260 may be a single core processor or a multiple core processor composed of a variety of materials, such as silicon, polysilicon, high-K dielectric, copper, and so on. The CRM 262 may include any suitable memory or storage device, such as random-access memory (RAM), static RAM (SRAM), dynamic RAM (DRAM), non-volatile RAM (NVRAM), read-only memory (ROM), Flash memory, or disk-based memory, useable to store device data 264 of the base station 104. The device data 264 includes network scheduling data, radio resource management data, beamforming codebooks, applications, and/or an operating system of the base station 104. Applications (not explicitly shown) and the device data 264 are executable by the processors 260 to enable communication with the UE 102 and network-side components, such as the neighbor base station 108 or the wireless network management node 122.

The CRM 262 also includes a SON facilitator 266. Alternately or additionally, the SON facilitator 266 may be implemented in whole or part as hardware logic or circuitry integrated with or separate from other components of the base station 104. In at least some aspects, the SON facilitator 266 configures the RF front end 254, the LTE transceivers 256, and/or the 5G NR transceivers 258 to implement the techniques for facilitating SON enhancement as described herein with regard to base stations, possibly in conjunction with other components, such as a communications processor or modem. For example, the SON facilitator 266 can handle DL SON messages, UL SON messages, and activities to start, participate in, and terminate a test scenario based on network configuration information received from a wireless network management node 122 (e.g., of FIGS. 1 and 3).

The base station 104 also includes an inter-base station interface 268, such as an Xn and/or X2 interface, as shown at 116 in FIG. 1. The inter-base station interface 268 can be used to exchange user-plane and control-plane data with another base station 108 (of FIG. 1) to manage communications between the base station 104 and the UE 102 with respect to the other base station 108, such as for handovers or cooperative bandwidth delivery (e.g., over multiple wireless connections). The base station 104 further includes a core network interface 270 to exchange user-plane and control-plane data with functions and entities of the core network 114 of FIG. 1, such as an EPC network or a 5G core network. Examples of core network functions are described below with reference to FIG. 4. These core network communications can include those made with a wireless network management node 122, an example of which is described below with reference to FIG. 3.

Figure 3:
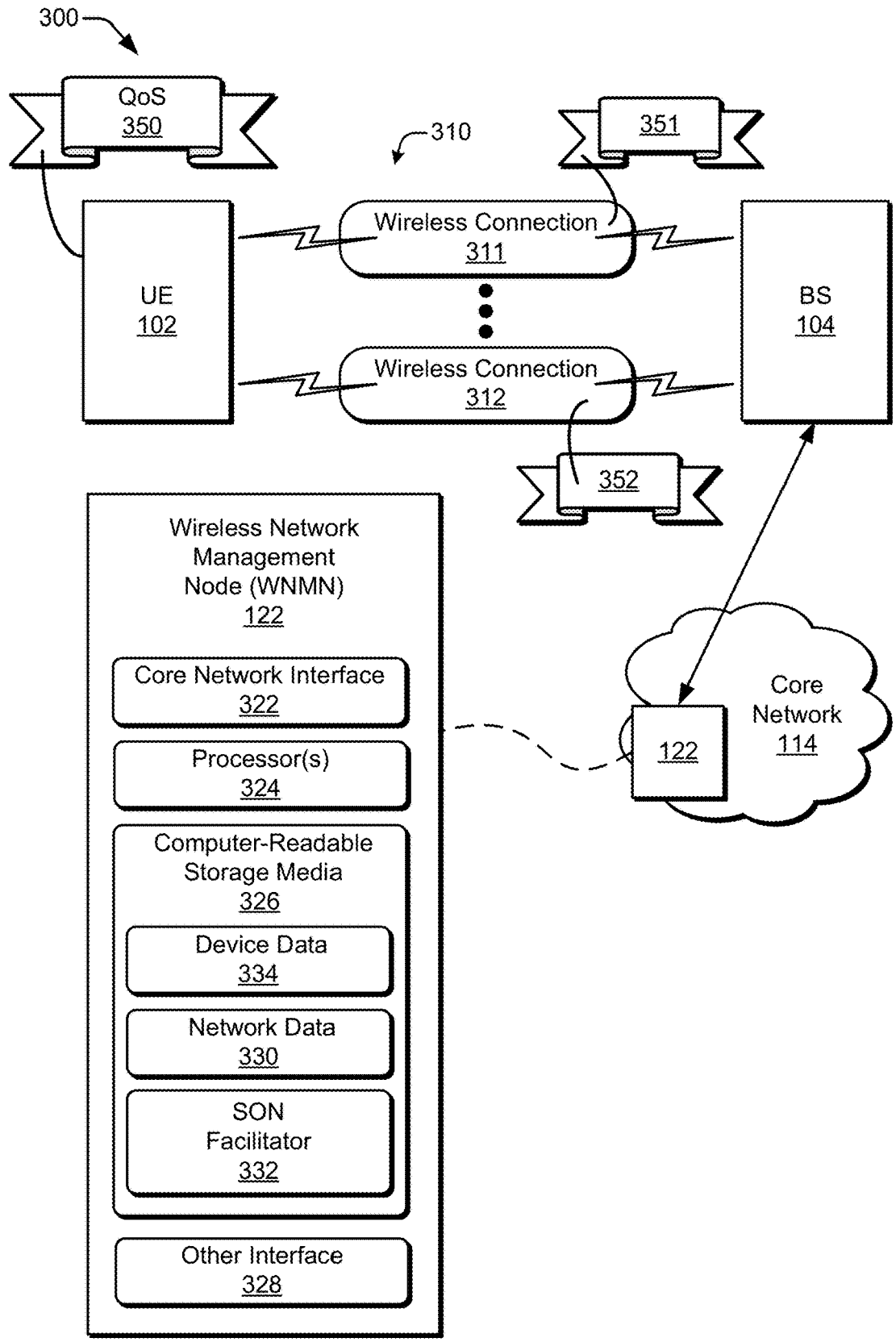
FIG. 3 is a schematic diagram illustrating an example network node, such as a wireless network management node (WNMN), that can implement various aspects of facilitating SON enhancement.

FIG. 3 is a schematic diagram 300 illustrating an example network node, such as a wireless network management node 122 (WNMN 122), that can implement various aspects of facilitating SON enhancement. The wireless network management node 122, as shown in FIG. 3, can correspond to any one or more network nodes, such as those realized in the core network 114. Example of such network nodes include, but are not limited to, a mobile switching center (MSC), a Serving GPRS Support Node (SGSN), a Mobility Management Entity (MME) node, a home subscriber server (HSS) node, a serving gateway (GW), a packet data network gateway (PDN GW), a Policy and Charging Rules Function (PCRF) server, a control node generally, a node realizing one or more of the functions described with reference to FIG. 4, some combination thereof, and so forth. The functionality of the wireless network management node 122 may be distributed across multiple network nodes or devices and may be physically distributed in any fashion suitable to perform the functions described herein. The wireless network management node 122 includes a core network interface 322 for communicating with other network components, such as the base station 104, using the core network 114. The other interface 328 enables the wireless network management node 122 to communicate with other entities, servers, and/or networks, such as the internet 118 of FIG. 1. Communications, such as user-plane data and control-plane data, can be made across network links to nodes providing different wireless network functionality as described below with reference to FIG. 4.

The wireless network management node 122 also includes one or more processors 324 and computer-readable storage media 326 (CRM 326). The processor 324 may be a single core processor or a multiple core processor composed of a variety of materials, such as silicon, polysilicon, high-K dielectric, copper, and so on. The CRM 326 may include any suitable memory or storage device, such as random-access memory (RAM), static RAM (SRAM), dynamic RAM (DRAM), non-volatile RAM (NVRAM), read-only memory (ROM), Flash memory, or disk-based memory, useable to store device data 334 of the wireless network management node 122. The device data 334 includes network organizational data, resource management data, applications, and/or an operating system of the wireless network management node 122. Applications (not explicitly shown) and the device data 334 are executable by the processors 324 to enable communication with other network-side components, such as the base stations 104/108, other wireless network nodes, or external networks.

The CRM 326 also includes network data 330 and a SON facilitator 332. Alternately or additionally, the SON facilitator 332 may be implemented in whole or part as hardware logic or circuitry integrated with or separate from other components of the wireless network management node 122. In at least some aspects, the network data 330 includes network configuration data which may be changed in accordance with a test scenario or measurement data from other network entities. The network configuration data can be altered between, for example, a first network configuration and a second network configuration to compare the first and second network configurations, which may be respectively tested at first and second times. As described herein, a test procedure can be performed safely and/or while maintaining a given QoS by instantiating at least two wireless connections with a UE for the test procedure. Of the at least two wireless connections, at least one wireless connection is configured in a manner that is known (e.g., based on experience or previous use) to be effective and/or to provide the given QoS should the wireless connection that is the subject of the test procedure fail. As used herein, a "failure," a "fail", or "failing" with regard to a wireless connection or some portion of a wireless network can refer to breaking a connection, falling under a targeted minimum bandwidth, exceeding a maximum latency, becoming unavailable to provide data throughput, ceasing to provide a network function, some combination thereof, and so forth.

Examples of network data 330, as well as alterations thereto for a test scenario, are described below with reference to FIG. 5. The SON facilitator 332 interacts with the network enhancement server 124 (e.g., of FIGS. 1 and 5) and other wireless network nodes and functions to implement the techniques for facilitating SON enhancement as described herein with regard to the wireless network management node 122. For example, the SON facilitator 332 can act as a liaison between the wireless network and the network enhancement server 124 to translate network configurations and adapt alternative testing network configurations to account for wireless network obligations. Thus, the SON facilitator 332 can instantiate and/or expose an API to support test scenarios created by the network enhancement server 124. This is described further with reference to FIG. 5.

The schematic diagram 300 also depicts multiple wireless connections 310 that can be established between the UE 102 and the base station 104. Specifically, a first wireless connection 311 and a second wireless connection 312 extend between the UE 102 and the base station 104. In some aspects, these wireless connections 310 can exist and can be utilized for communication simultaneously, such as if both the UE 102 and the base station 104 have multiple wireless transceivers or if the UE 102 uses a single transceiver in a time-division multiplexed manner while the base station 104 has multiple transceivers. In example operation, if the UE 102 has at least two transceivers, both the wireless connections 311/312 can communicate data during a same radio frame. If, on the other hand, the UE 102 has a single transceiver, the two wireless connections 311/312 can interleave data communications on alternating radio frames with time-division duplexing (TDD). Although only two wireless connections 311/312 are explicitly shown, more than two wireless connections 310 can also be established. Each wireless connection 310 may be implemented using a same or a different wireless technology (e.g., both 4G LTE, both 5G NR, or one each of 4G LTE and 5G NR). Further, each wireless connection 310 may be established with a same base station 104 or with different base stations 104.

The UE 102 can be associated with at least one QoS 350. The QoS 350 relates to a guarantee or obligation from a network operator to an account holder or a UE thereof to provide some minimum level of service in terms of throughput, latency, security, and so forth. As shown, a quantity of different QoS levels or types may reach at least two: a first QoS 351 and a second QoS 352. However, a network may implement greater or fewer different types of QoS. In the depicted example, the first wireless connection 311 is associated with the first QoS 351, and the second wireless connection 312 is associated with the second QoS 352. With multiple wireless connections 310, a first wireless connection 311 can remain in effect and unchanged during a test scenario to guarantee the first QoS 351. Meanwhile, a second wireless connection 312 can be adjusted in accordance with a test scenario in an attempt to improve network performance for the corresponding UE 102 individually or for the wireless network as a whole. In an example operation, the wireless network management node 122 is aware of the QoS 350 and the capabilities of the UE 102 as per the network data 330. Thus, the SON facilitator 332 can revise or adapt an alternative network configuration to transform the alternative configuration to ensure it meets this QoS 350 during execution of a test scenario.

Example Approaches to Network Organization

Figure 4:
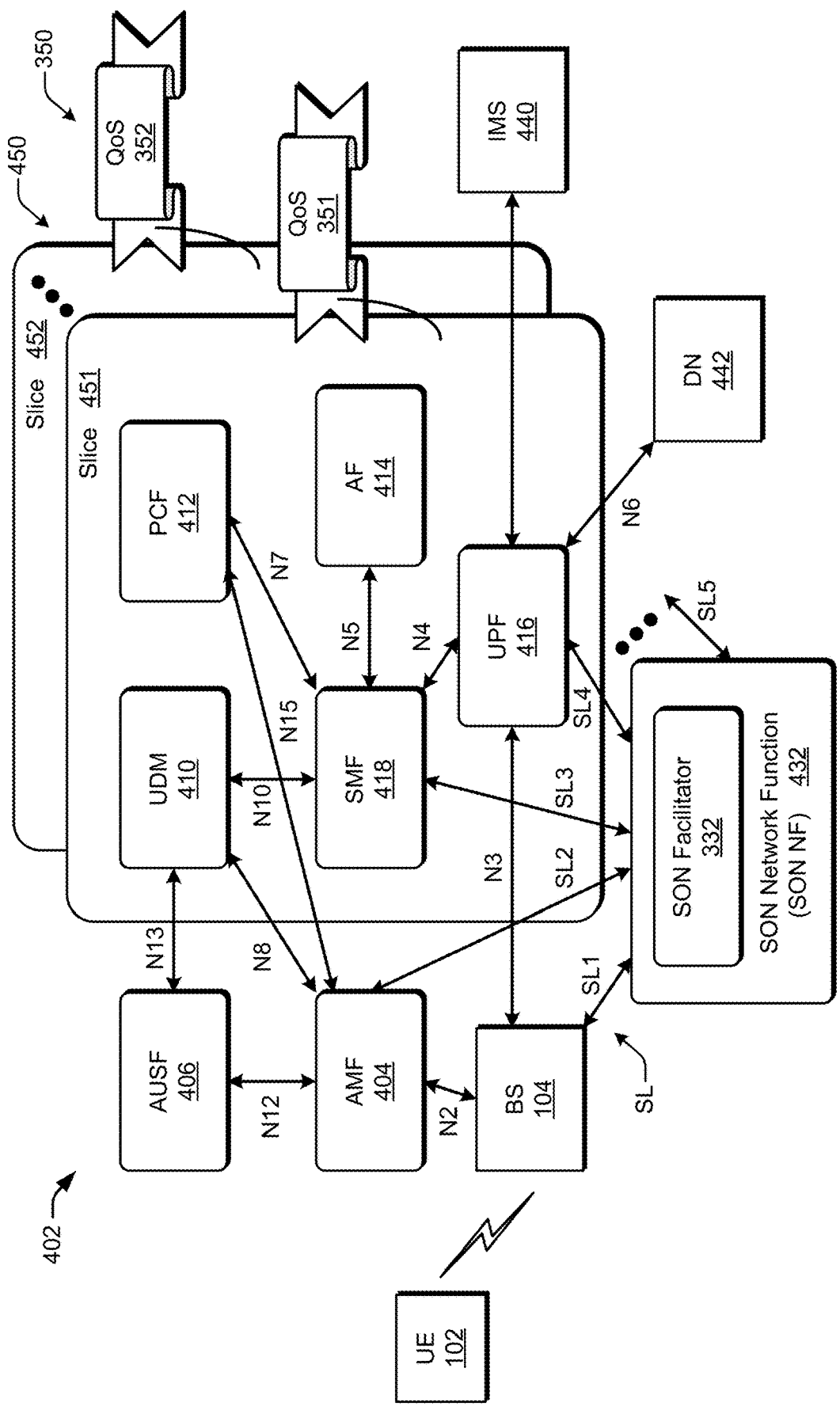
FIG. 4 is a schematic diagram of an example wireless network, which can facilitate SON enhancement, from a functional perspective.

FIG. 4 is a schematic diagram 400 of an example wireless network 402, which can facilitate SON enhancement, from a functional perspective. The wireless network 402 is depicted to include one or more example network functions or network function entities. For example, the wireless network 402 includes a SON network function (NF) 432 (SON NF 432). The SON facilitator 332 can implement the SON NF 432. In addition to the base station 104, the wireless network 402 can include an access and management function 404 (AMF 404) and an authentication sever function 406 (AUSF 406). The wireless network 402 can also include the following network functions: unified data management 410 (UDM 410), a policy control function 412 (PCF 412), an application function 414 (AF 414), a user plane function 416 (UPF 416), and a session management function 418 (SMF 418). The wireless network 402 is coupled to a data network 442 (DN 442), such as the internet 118 (of FIG. 1), and an internet protocol (IP) multimedia subsystem or service 440 (IMS 440), which can interface with other networks for voice, images, videos, texts, or messaging or for coupling to legacy phone systems.

The wireless network 402 is coupled together internally and to external nodes and functions using network links (N). Some example network links N2-N8, N10, N12, N13, and N15 are explicitly shown. For example, the network link N3 establishes a communication channel or protocol between the base station 104 and the UPF 416. Similarly, the network link N5 establishes a communication channel or protocol between the SMF 418 and the AF 414. The SON NF 432 can utilize existing network links N or newly-provisioned or specified network links to communicate with network functionalities and other components. For either approach, example SON links (SL) are shown between the SON NF 432 and certain functionalities and network nodes. For example, SON links SL1, SL2, SL3, and SL4 are explicitly depicted. However, as represented by SON link SL5, the SON NF 432 can directly or indirectly communicate with other functions and network nodes using other SON links SL. Thus, the SON facilitator 332 can obtain network configuration from any given functionality or network node and can provide instructions or other directions related to execution of a test scenario to any particular functionality.

In FIG. 4, the wireless network 402 is also shown to include multiple network slices 450 to implement network slicing. For example, a first slice 451 and a second slice 452 are explicitly depicted, but a wireless network can have more or fewer slices 450. Generally, each slice 450 is responsible for provisioning network resources to accommodate some network service or enable some network capability, such as meeting a particular industry's network preferences or establishing some minimum level of authentication or security. For example, a given slice 450 may correspond to a QoS 350. A QoS 350 corresponding to a slice 450 may be the same as or different from a QoS 350 associated with a UE, as shown in FIG. 3. As illustrated in FIG. 4 by way of example, QoS levels for network slices may number at least two, such as a first QoS 351 and a second QoS 352. Here, as shown in FIG. 4, the first slice 451 corresponds to the first QoS 351, and the second slice 452 corresponds to the second QoS 352. Thus, the SON facilitator 332 has access to a slice or slices 450 that can guarantee a given QoS 350 to enable the SON facilitator 332 to adapt a potential network configuration for a test scenario to ensure that a stipulated QoS for a UE is provided during and after execution of a test scenario, even if operation of one slice is degraded (e.g., slowed or becomes prone to packet loss) responsive to the execution of the test scenario. Example network configuration information and actions by the SON facilitator 332 to provide an API for SON enhancement are described below with reference to FIG. 5.

Example Schemes, Devices, and Components

Figure 5:
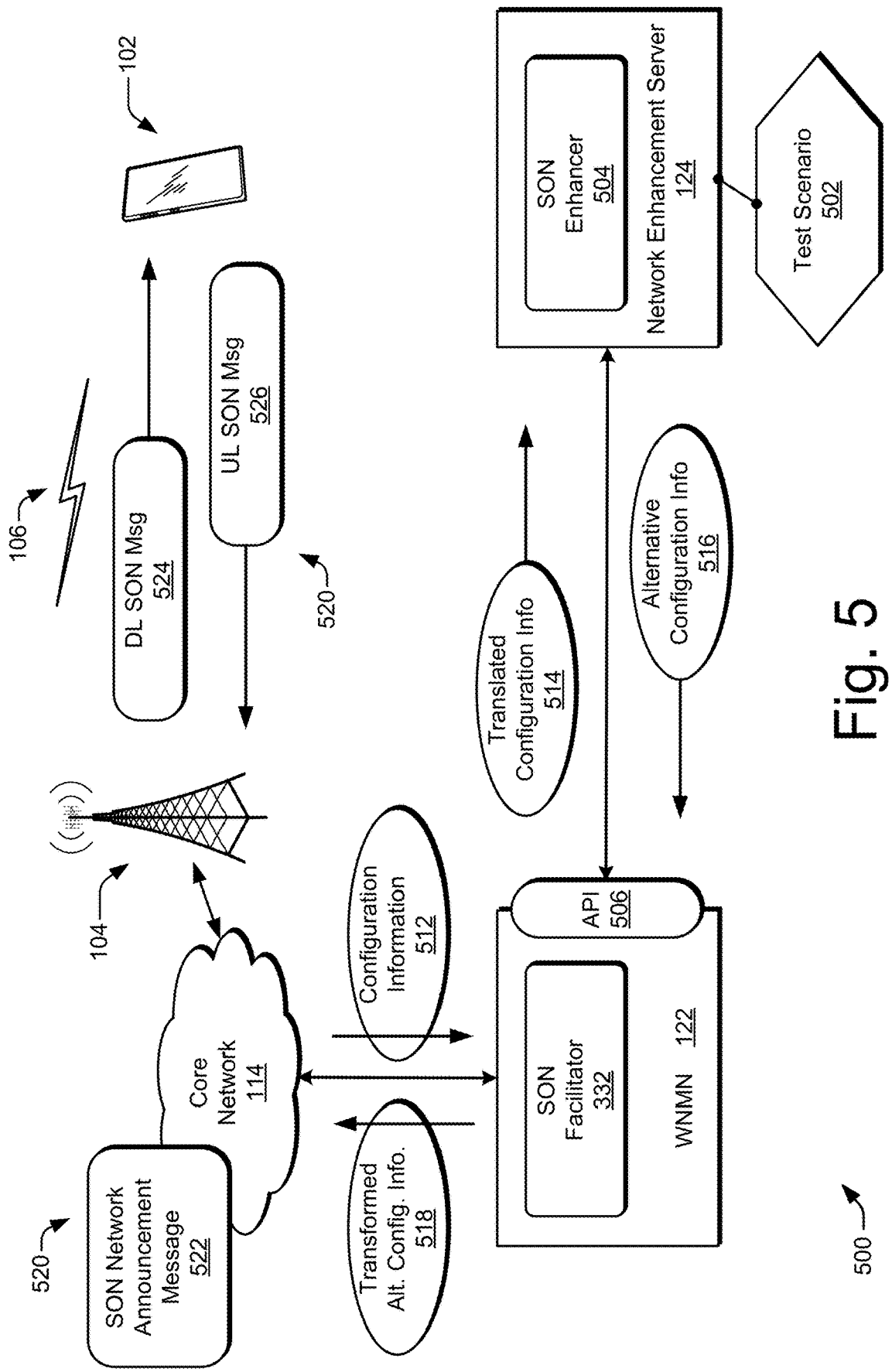
FIG. 5 illustrates an example scheme for facilitating SON enhancement with a UE or a wireless network management node (WNMN), which node interfaces with a network enhancement server.

FIG. 5 illustrates an example scheme 500 for facilitating SON enhancement with a UE 102 or a wireless network management node 122 (WNMN 122), which interfaces with a network enhancement server 124. In some aspects, the network enhancement server 124 includes a SON enhancer 504. The network enhancement server 124 can include one or more processors or CRM and at least one network interface (not shown in FIG. 5), similar to those that are described above for the wireless network management node 122 with reference to FIG. 3. Although shown as two separate nodes or server devices, the wireless network management node 122 and the SON facilitator 332 can be merged with the network enhancement server 124 and the SON enhancer 504 (e.g., into a single node or a combined functional entity). The SON enhancer 504 can be realized using, for instance, an artificial intelligence (AI) mechanism that employs an AI algorithm Examples of AI mechanisms include, but are not limited to, machine learning, neural networks, reinforcement learning, iterative refinement (e.g., guided trial and error or A/B testing), combinations thereof, and so forth. In operation, the SON enhancer 504 creates a test scenario as described below.

In example implementations, the SON facilitator 332 obtains configuration information 512. The SON facilitator 332 can obtain the configuration information 512 from, for instance, the wireless network 402 of FIG. 4, including from at least one base station 104 or one or more user equipments (UEs) that are wirelessly coupled thereto. The configuration information 512 can include network-wide configuration information, cell-level configuration information, UE configuration information, and so forth, depending on how much or what portions of a wireless network is or are being enhanced using a given test scenario 502. To enable the SON enhancer 504 to process the configuration information 512, the SON facilitator 332 instantiates an API 506 for interfacing the SON enhancer 504 with the wireless network. As part of an API 506, in some aspects, the SON facilitator 332 translates the configuration information 512 to produce translated configuration information 514.

This translation can include, for example, filtering of irrelevant data, conversion of data types, reformatting of the data to accommodate inputs of the SON enhancer 504, disassociation of account information from configuration information, amalgamation of individual measurement and performance data into batches, and so forth. The SON facilitator 332 can also collect measurement information from the wireless network about a previous test scenario to feed back into the AI mechanism. To feed this information back, the SON facilitator 332 can add the collected measurement information into the translated configuration information 514. The SON facilitator 332 provides the translated configuration information 514 to the SON enhancer 504. The SON enhancer 504 processes the translated configuration information 514 to produce alternative configuration information 516 that represents a test scenario 502. The SON enhancer 504 can change any of a multitude of network parameters, such as radio access or radio network parameters, to adapt performance in accordance with the SON principles implemented by a given SON enhancement system.

Example configurable parameters that can be adjusted as part of a test scenario 502 include the following: carrier frequency (channel), physical cell identifier (PCI), OFDM numerology, transmit power, handoff/cell-selection thresholds, physical random-access channel (PRACH) resource configurations, timer values, network load/scheduling information, antenna configuration, antenna downtilt, antenna boresight direction, UL/DL configuration, another L1/L2/L3 radio resource control (RRC) configuration parameter, combinations thereof, and so forth. However, any parameter specified in a wireless open standard or proprietary standard can be adjusted to enhance network performance. Thus, the SON enhancer 504 can change any one or more of these parameters to produce alternative configuration information 516. A scope or a scale of the test scenario 502 is selectively adjustable. The SON enhancer 504 can perform an enhancement procedure on, for example, a single user equipment, multiple user equipments, a single base station or cell, multiple base stations or cells, at least one network slice or portion thereof, a geographically-defined portion of a wireless network, a whole wireless network, and so forth. Further, the SON enhancer 504 can perform an enhancement procedure for a metro area at different times of day, as user equipment moves around, as the wireless network load fluctuates over time or varies geographically, and so forth. The SON enhancer 504 provides the alternative configuration information 516 to the SON facilitator 332 using the API 506.

Thus, the SON facilitator 332 accepts the alternative configuration information 516 that represents the test scenario 502. Here, the alternative configuration information 516 includes at least the configuration information that is being changed as per the SON enhancer 504. The SON facilitator 332 has access to some current network conditions (e.g., a QoS 350 that is in effect for a given UE 102) that the SON enhancer 504 may not have access to. Further, the SON facilitator 332 has knowledge of the protocols to communicate with other network functionality, such as that involved with using the network links N of FIG. 4 or messaging formats. The SON facilitator 332 is therefore configured to convert the alternative configuration information 516 into instructions and messages interpretable by the other network functions. Thus, the SON facilitator 332 uses these capabilities to process the alternative configuration information 516 and generates transformed alternative configuration information 518 based on the wireless network communication protocols and responsive to current network conditions.

To implement the test scenario 502, multiple SON messages 520 are generated and communicated within the wireless network. Generally, a SON message 520 can be realized using, for instance, a network announcement message, such as network change announcement message. SON messages 520 include, for example, a SON network announcement message 522, a downlink SON message 524 (DL SON Msg 524), and an uplink (UL) SON message 526

(UL SON Msg 526). Thus, using these SON messages 520, network elements can communicate configuration information 512 or transformed alternative configuration information 518 to other network elements. For example, using these SON messages 520, the transformed alternative configuration information 518 is disseminated around the wireless network to different network functions and devices that are to participate in the test scenario 502. In this manner, those user equipments that are to be affected by the test scenario 502 are informed of the relevant configuration changes and other characteristics of the test scenario 502. To do so, the SON facilitator 332 can generate a DL SON message 524 and populate the message with one or more indications descriptive of the test scenario 502 and at least those associated configuration changes that affect the UE 102. The base station 104 then transmits the DL SON message 524 to the UE 102.

Alternately or additionally, the SON facilitator 332 can send a SON network announcement message 522 to a network element, such as the base station 104, describing aspects of the test scenario 502, such as the first wireless connection 311 and the second wireless connection 312. The base station 104 in turn generates the DL SON message 524 based on the SON network announcement message 522 and transmits the DL SON message 524 to the UE 102 to inform the UE 102 of the back-up connection and the test connection. Thus, network elements may also generate network change messages. In response, the UE 102 transmits an UL SON message 526 to the base station 104 acknowledging the test scenario 502 and indicating participation in the test scenario 502 (e.g., indicating a plan to execute a portion of the test scenario 502 that corresponds to the UE 102). Example formats for the UL SON message 526 and the DL SON message 524, as well as factors considered by the SON facilitator 332 for formulating the latter message, are described below with reference to FIG. 6.

Figure 6:
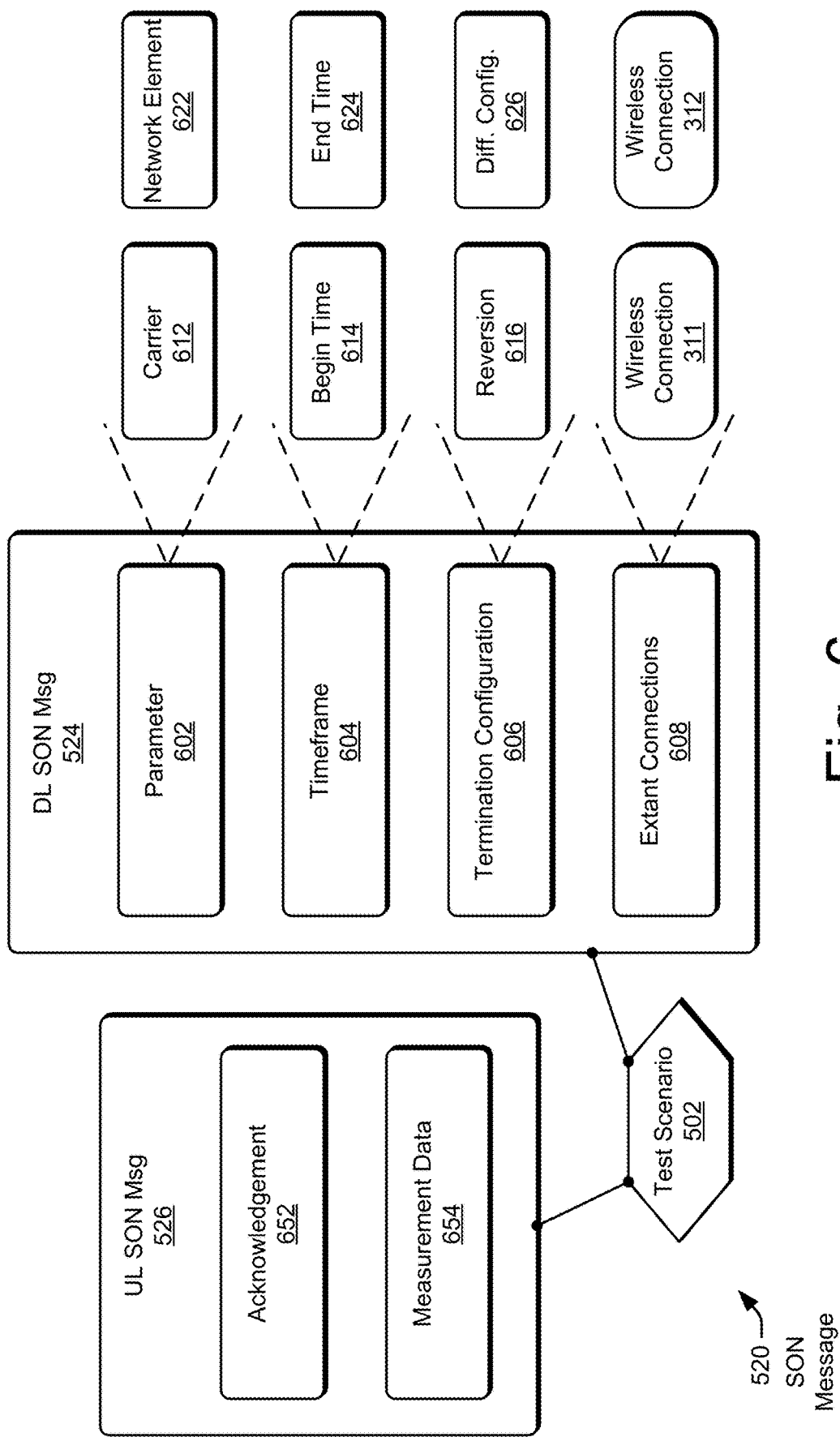
FIG. 6 illustrates example SON messages, including an example downlink SON message for transmission to a UE to indicate a test scenario and characteristics thereof and an example uplink SON message.

FIG. 6 illustrates example SON messages 520, including an example UL SON message 526 and an example DL SON message 524, which is for transmission to a UE to indicate the test scenario 502 and characteristics thereof. Although one SON message is shown for each of the UL and DL, multiple SON messages may be communicated for the UL or the DL as part of facilitating SON enhancement. At least one UL SON message 526 is transmitted by the UE 102 to a serving base station 104 to acknowledge receipt of a DL SON message and indicate that the UE 102 will participate in the test scenario 502. At least one UL SON message 526 can include, for example, an acknowledgement 652, measurement data 654, and so forth. The acknowledgement 652 can include an acknowledgement of the test scenario 502 or of the specific network configuration parameters that will be utilized during the test scenario 502. The acknowledgment 652 can comprise an affirmative indicator within the UL SON message 526 or be intrinsically represented by transmission of the UL SON message 526—e.g., in response to receiving a DL SON message 524. During or after the test scenario 502, the UE 102 can populate the UL SON message 526 with the measurement data 654. The measurement data 654 includes at least data indicative of network performance that may be affected by one or more parameters (e.g., radio access or radio network parameters) that are changed by the test scenario 502. However, the measurement data 654 can include other types of data. In operation, the base station 104 receives the measurement data 654 and forwards the measurement data 654 in another SON message 520 (not explicitly shown) across a core network (e.g., of FIGS. 4 and 5) to the SON facilitator 332 for processing.

Additionally or alternatively, a SON facilitator 216 of a UE 102 may populate an UL SON message 526 with other information, including as part of an acknowledgment 652 or measurement data 654 or as part of another field or portion of the message. For example, the UL SON message 526 may be populated with UE configuration or status information for before, during, or after an execution of the test scenario 502. Further, the UL SON message 526 may include a request to decline participation in the test scenario 502, including a request that the test scenario not be implemented generally or that the UE receive special treatment, such as changing the UE configuration before the test. The SON facilitator 216 may also include in the UL SON message 526 a reason for declining participation in the test scenario 502. An UL SON message 526 can alternatively include a request to change configuration (e.g., a request to move to another frequency) before the test scenario 502 is implemented. Other information that a SON facilitator 216 can incorporate as part of an UL SON message 526 includes one or more measurements related to at least one nearby base station, which measurements can help the network move the UE to a different base station if requested or if otherwise appropriate (e.g., to provide a given QoS). An UL SON message 526 can also include other information or combinations of information.

In some implementations generally, at least one DL SON message 524 announces which parameter (e.g., an RF carrier, one or more RAN nodes/sectors, a core network server, or a network slice) is going to be tuned for network enhancement. Alternatively, the DL SON message 524 can announce which carriers or other components are not involved in the test scenario 502. The DL SON message 524 also indicates when the network change will take place and at what time it will conclude. The DL SON message 524 also indicates if the network will, upon conclusion of the test, return to the previous configuration or will change to a new different configuration. If a different configuration, the DL SON message 524 can include parameters specifying this future configuration, too. The wireless network can communicate the DL SON message 524 to the UE 102 using a broadcast mechanism (e.g., a broadcast message), a media access control (MAC) control element (CE) (e.g., an L2 MAC CE), an over-the-top message, and so forth.

Generally, information can be provided in at least one DL SON message 524 to prepare user equipments for execution of a test scenario. The information can include, for example, moving a primary component carrier (PCC) of a user equipment, adding a new secondary component carrier (SCC) to a user equipment, indicating measurements to be taken, identifying one or more Physical Random Access Channel (PRACH) parameters for backup network-attachment opportunities, and so forth. As illustrated, at least one DL SON message 524 can include at least one parameter 602 that is being changed directly or that may otherwise be impacted by execution of the test scenario 502. Thus, the parameter 602 can comprise a parameter that is being configured in accordance with the alternative configuration information 516 of FIG. 5. The parameter 602 can relate, for example, to a carrier 612 (e.g., one or more characteristics of a wireless signal assigned to a UE 102) or a network element 622 (e.g., a base station, a mobile management entity, a serving gateway, etc.). In some cases, the parameter 602 comprises a radio access parameter or a radio network parameter. As another example, the parameter 602 can include a PRACH resource on another carrier and/or cell to which a UE can move if the UE is declining to participate in the test scenario 502. If a parameter 602 that is being changed by a test scenario 502 is not directly utilized by the UE 102 (e.g., a parameter that configures a network slice 450 that is opaque to a wireless connection 310 but can nevertheless impact performance of the wireless connection 310), the parameter 602 can be omitted from the DL SON message 524.

The at least one DL SON message 524 can also include a timeframe 604 for the test scenario 502, a termination configuration 606, one or more extant connections 608 (e.g., that identify wireless connections 310), and so forth. The timeframe 604 is indicative of when the test scenario 502 is scheduled to occur and can include a begin time 614 or an end time 624 (or both) for execution of the test scenario 502. The begin time 614 and the end time 624 can be specified in different manners, such as with reference to a synchronized clock, at least one radio frame, at least one sub-frame, an event—including an arrival of a DL SON message 524, combinations thereof, and so forth. In terms of clock time, a test scenario may last for minutes (e.g., 5 minutes, 18 minutes, or an hour). This may be appropriate for a bulk configuration testing scenario directed to determining a large-scale network configuration for blocks of time, such as commute hours versus non-commute hours. Alternatively, a test scenario may last on the order of milliseconds (e.g., 10s of milliseconds or half a second). This time period may be appropriate for testing an alternative configuration for a short-term or transient network condition or for a few user equipments wirelessly coupled to a given base station. In terms of frames, a test configuration may be employed for a few (e.g., 3-8) sub-frames or radio frames. Other frame-based testing configurations can entail testing for some sequence of frames (e.g., every other frame for 200 milliseconds or every 5th frame for several 100 milliseconds). However, a timeframe 604 of a test scenario 502, including a begin time 614 or an end time 624 thereof, may be specified in alternative manners, such as by specifying a period that starts to elapse after a particular event or a synchronized clock time and then extends for some number of frames or units of time or until another event. Thus, an end time 624 can be indicated using an elapsed period after a begin time 614, a detectable terminating event, a synchronized clock time, a number of frames after a begin time 614 or a detectable starting event, some combination thereof, and so forth. After the specified end time 624 indicative of a conclusion of the timeframe 604, a previous or other known configuration can be restored such that the UE can revert to a configuration with a predictable level of reliability.

The termination configuration 606 is indicative of a network configuration, at least as it pertains to the receiving UE, that is to be enacted responsive to termination of an execution of the test scenario 502, such as at the end time 624. The termination configuration 606 can correspond to radio access or ratio network configuration settings for a third wireless connection. The termination configuration 606 can include, for instance, a reversion indication 616, a different configuration 626, and so forth. The reversion indication 616 informs the receiving UE that a network configuration that was in effect prior to execution of the test scenario 502 is to be reactivated at the termination of the test scenario 502. Thus, in response to receiving the reversion indication 616, the UE can revert at the end time 624 to using at least one wireless connection configuration that was in use prior to the execution of the test scenario 502. The different configuration 626 represents a third network configuration—after the initial configuration and the test configuration. The different configuration 626 can be specified by the DL SON message 524 as a configuration specification with explicit included information or by reference to a configuration that is sent to the UE at a different time. In either case, the UE is instructed to operate in accordance with the different configuration 626 responsive to the occurrence of the end time 624. By way of example, a DL SON message 524 can announce that an RF carrier #1 will have a change (e.g., to a transmit power configuration) during a specific time (e.g., from a begin time 614 of 1:00:00 pm to an end time 624 of 2:00:00 pm). As another example, the termination configuration 606 can specify one or more alternate cells, times, and/or PRACH options for attempting to return to the wireless network in case of a failure of a wireless connection or a network slice.

During the execution of the test scenario 502, changed parameters may reduce network performance or even break a wireless connection of a UE or a wired connection of the core network that is coupled to the wireless connection of the UE. To protect against this potential, traffic with a relatively high QoS can be moved to other resources that are to remain unaffected during execution of the test scenario 502 to ensure that the QoS obligation is met. Thus, multiple connectivity, such as dual connectivity, can be utilized as part of autonomous network enhancement. Dual connectivity allows configuration changes to be implemented with respect to a second carrier while a first carrier can be used to maintain reliable network connectivity. This approach enables controlled A/B testing of a wireless network but uses multiple connectivity to insure communication reliability.

Thus, to facilitate SON enhancement, a UE 102 can be allocated multiple wireless connections, at least during execution of the test scenario 502. To indicate these multiple wireless connections, the DL SON message 524 can include extant connections 608 that indicate what wireless connections 310 (of FIG. 3) are to be in effect during the test scenario 502. As shown in FIG. 6, the extant connections 608 include a first wireless connection 311 and a second wireless connection 312. During the execution of a network experiment, one wireless connection may remain unchanged by the test scenario 502. This wireless connection, which can be explicitly identified by the extant connections 608, can therefore be assigned to provide a particular QoS that is guaranteed to the UE 102. The other wireless connection can be varied by the test scenario 502, such as by changing at least one parameter that can impact that other wireless connection. If the UE is not already associated with multiple wireless connections, the SON facilitator 332 can provision a second wireless connection so that at least one wireless connection can be unaffected by the test scenario 502 as described herein.

The SON facilitator 332 of FIGS. 3-5 can provision the connections 310 in many different manners. In some implementations, the SON facilitator 332 provisions a first connection 311 to provide a substantially reliable connection and the second connection 312 to be configured in accordance with the alternative configuration information 516 as per the transformed alternative configuration information 518. To provide a substantially reliable connection, the first connection 311 can be substantially independent of the network resources being configured in accordance with the alternative configuration information 516 for the test scenario 502, such as by being assigned to a different network slice 450, a different base station 104, or a different carrier than is assigned to the second connection 312. Alternatively, the first connection 311 can be configured in accordance with a previously-utilized network configuration that has been tested or already achieved satisfactory field performance. As another example, the first connection 311 can be configured to have a given QoS 351, such as by using radio access and core network resources in manner that has been used successfully at some time previously. In contrast, the second connection 312 is configured with an alternative or changed parameter (e.g., a radio access or radio network parameter) that is indicated by the alternative configuration information 516. The changed or alternative parameter may be relative to that used previously by the UE 102 in another connection, may be relative to a different one employed by the first connection 311, may be relative to an input to the SON enhancer 504 that results in the alternative parameter at the output thereof, and so forth.

To accommodate the factors presented above for provisioning the first and second connections 311 and 312, the SON facilitator 332 can provision new connections for the first and second connections 311 and 312 relative to the connection or connections being used immediately previously by the UE 102. In an alternative case, the SON facilitator 332 can maintain a current connection as the first connection 311 that provides a reliable connection for the UE. The SON facilitator 332 therefore directs the wireless network (e.g., using a SON network announcement message 522) to establish a new connection in accordance with at least one alternative parameter of the alternative configuration information 516 for the second connection 312. Other approaches to provisioning the first and second connections 311 and 312 can alternatively be implemented.

Thus, the first wireless connection 311 and the second wireless connection 312 can be realized in many different manners such that the first wireless connection 311 is to be unchanged by a test scenario 502 and the second wireless connection 312 is to use at least one radio access network parameter 602 specified by at least one DL SON message 524. Two examples are described here. In a first example, a DL SON message 524 can include a secondary component carrier (SCC) activation message that directs the UE 102 to establish a new wireless connection as the second wireless connection 312 having at least one radio access network parameter 602 configured in accordance with the test scenario 502. In this first example, an existing primary component connection (PCC) can be continued as the first wireless connection 311. In a second example, prior to a begin time 614 of the testing timeframe 604, the UE can establish a known wireless configuration on an SCC as the first wireless connection 311, including by moving an existing connection or creating a new one using a known configuration. In this second example, the PCC can then be configured to use the at least one radio access network parameter 602 that is configured in accordance with the test scenario 502. In both cases, the first wireless connection 311 can be unchanged by the test scenario 502 from a known wireless configuration that has been used previously to achieve a particular QoS or otherwise to provide a reliable data throughput for the UE 102. Generally, the more recently the known wireless configuration was used previously, the more likely the first wireless connection 311 is to be functioning as a fallback should the second wireless connection 312 fail completely (e.g., drop a connection) or fail in terms of some targeted minimum bandwidth or maximum latency.

Figure 7:
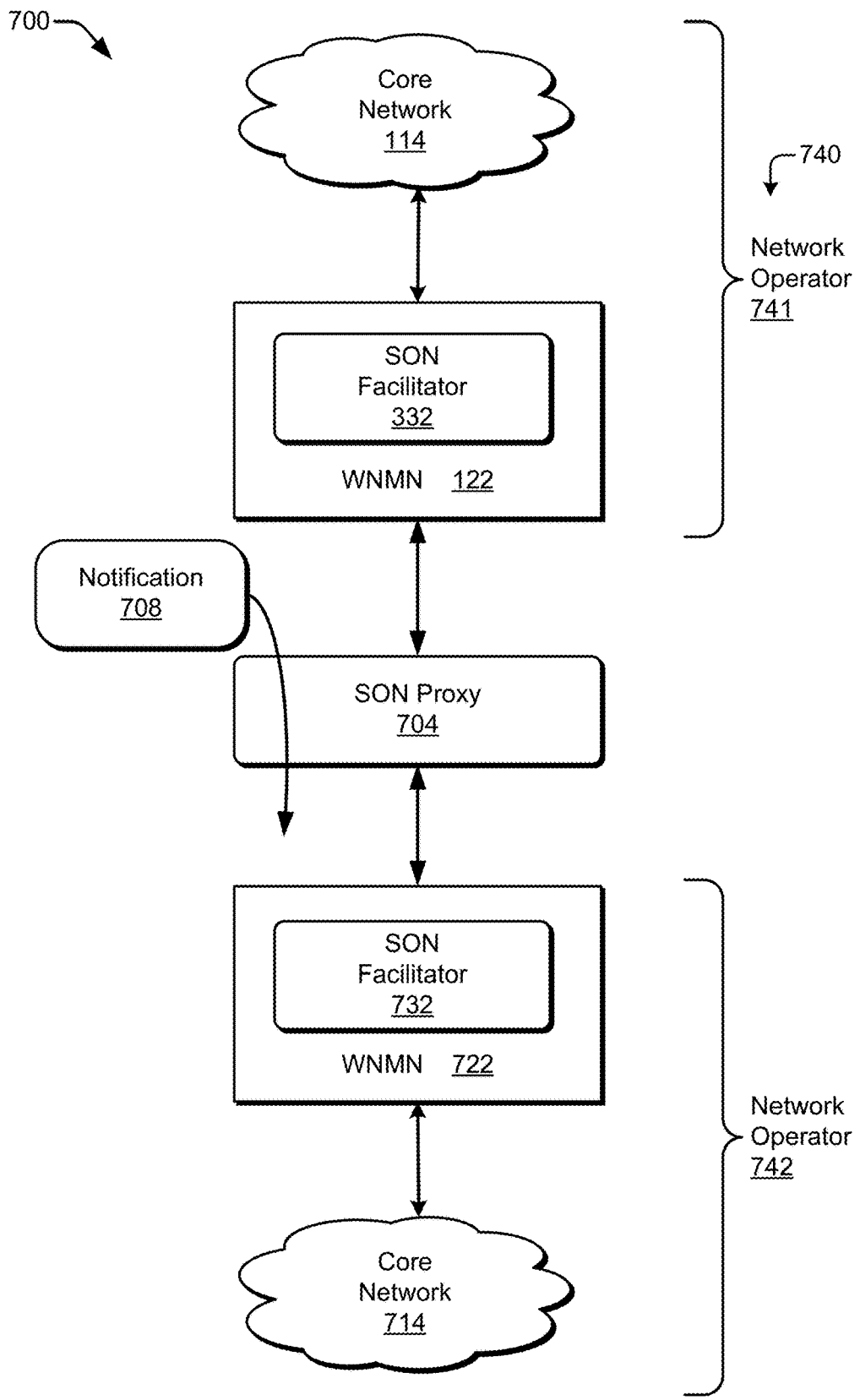
FIG. 7 is a schematic diagram of two example wireless networks, which respectively correspond to two different network operators, which can facilitate SON enhancement using a SON proxy.

FIG. 7 is a schematic diagram 700 of two example wireless networks, which respectively correspond to two different network operators 740, which can facilitate SON enhancement using a SON proxy 704. As illustrated, the network operators 740 include a first network operator 741 and a second network operator 742. However, additional network operators can be coupled to the SON proxy 704. The first network operator 741 operates a first network that includes a first core network 114 and a first wireless network management node 122 having a first SON facilitator 332. The first SON facilitator 332 is coupled to the SON proxy 704. The second network operator 742 operates a second network that includes a second core network 714 and a second wireless network management node 722 having a second SON facilitator 732. The second SON facilitator 732 is also coupled to the SON proxy 704.

The SON proxy 704 allows different network operators 740 to communicate with each other to enable coordination on SON efforts using an inter-operator SON message. For example, the first SON facilitator 332 can generate a notification 708 and transmit the notification 708 to the second SON facilitator 732 using the SON proxy 704. The notification 708 can provide information in advance of an upcoming test scenario 502 that is to be conducted by the first SON facilitator 332. In other words, a SON proxy 704 can facilitate an exchange of courtesy messages, such as when a carrier plans to change a network configuration in an unlicensed band.

In some implementations, the SON proxy 704 is realized as a network server that exists between the core networks of two cellular carrier networks and is operationally disposed between their respective SON NFs 432 (of FIG. 4). The SON proxy 704 can be operated by either network operator 740, by a partnership including both the first and second network operators 741 and 742, by a third party, and so forth. Exchanging inter-operator SON messages can facilitate announcement of network changes across different carriers, such as if two carriers have proximate spectrum allocations or for unlicensed bands (e.g., 5G or Citizens Broadband Radio Service (CBRS)) with carrier that are geographically close. An example of an unlicensed, or shared, band is CBRS. In the case of CBRS, a network change notification 708 can alternatively be routed through a CBRS spectrum access system (SAS) server.

Figure 8:
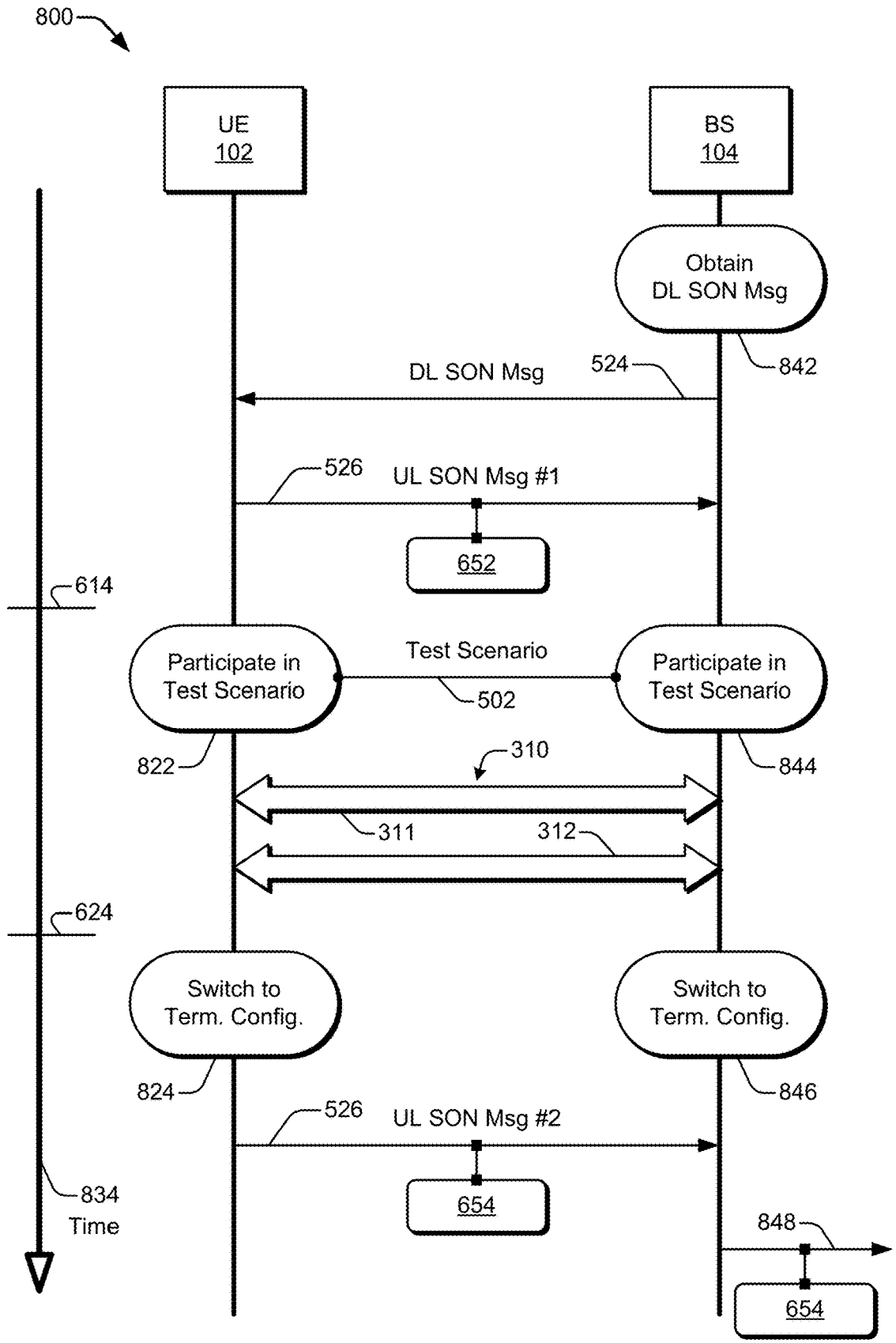
FIG. 8 is a sequence diagram illustrating examples of operations and communications between a UE and a base station to facilitate SON enhancement in accordance with a wireless signaling protocol.

FIG. 8 is a sequence diagram 800 illustrating examples of operations performed by, and communications exchanged between, a UE 102 and a base station 104 to facilitate SON enhancement in accordance with a wireless signaling protocol. The operations or communications can be performed at least partially by a SON facilitator 216 (as shown in FIG. 2) of the UE 102 or by a SON facilitator 266 (also of FIG. 2) of the base station 104. In the example sequence diagram 800, time 834 increases in a downward direction. Along the time 834, a begin time 614 and an end time 624 are indicated for a test scenario 502 that is to be executed. However, the arrow for time 834 is not necessarily depicted to scale relative to the occurrences of the operations and communications. Two example types of SON message communications are shown: a DL SON message 524 and an UL SON message 526.

In example implementations, the base station 104 obtains a DL SON message at 842. The base station 104 can receive a prepared DL SON message from a SON facilitator 332 (e.g., of FIGS. 3 and 5). Alternatively, the base station 104 can receive from the SON facilitator 332 information regarding a test scenario 502 that is usable to populate a DL SON message, and the base station 104 can then generate the DL SON message using the received information. Regardless, the base station 104 wirelessly transmits the DL SON message 524 (DL SON Msg) to the UE 102 with the DL SON message 524 including a description of at least one aspect of the test scenario 502 as described above with reference to FIG. 6. For example, the DL SON message 524 can be indicative of the test scenario 502 and specify at least one radio access network parameter that is configured in accordance with the test scenario 502.

The UE 102 receives the DL SON message 524 from the base station 104.

In response to the received DL SON message 524, the UE 102 formulates a first UL SON message 526 (UL SON Msg #1) that acknowledges receipt (e.g., as represented by the acknowledgement 652) of the DL SON message 524 and indicates that the UE 102 will participate in the test scenario 502. Accordingly, the UE 102 transmits the first UL SON message 526 (#1) to the base station 104. The base station 104 therefore receives the first UL SON message 526 (#1).

Responsive to an occurrence of the begin time 614, the UE 102 participates in the test scenario 502 at 822, and the base station 104 participates in the test scenario 502 at 844. During execution of the test scenario 502, the base station 104 and the UE 102 can communicate using multiple wireless connections 310, such as a first wireless connection 311 and a second wireless connection 312. Although the first and second wireless connections 311 and 312 are depicted "sequentially" relative to the arrow of time 834, the existence or usage of the wireless connections may overlap and/or be extant during substantially all of the test scenario 502. Responsive to the end time 624 for the execution of the test scenario 502, the UE 102 switches to the termination configuration 606 (of FIG. 6) at 824 to establish a third wireless connection, which may correspond to the wireless connection configuration of the first wireless connection. Further, the base station 104 also switches to the termination configuration 606 at 846. Thus, both the UE 102 and the base station 104 can start to communicate using a same set of the corresponding radio access or ratio network configuration settings at the end time 624.

Using a configuration of the termination configuration 606, the UE 102 transmits a second UL SON message 526 (UL SON Msg #2) to the base station 104. The second UL SON message 526 (#2) includes measurement data 654 taken by the UE 102 during the test scenario 502. Alternatively, the UE 102 can upload the measurement data 654 to the wireless network using the base station 104 at the end of, or otherwise during, the test scenario 502 (e.g., before switching to the termination configuration 606). In either case, the base station 104 receives the measurement data 654 from the UE 102 using the second UL SON message 526 (#2). The base station 104 forwards the measurement data 654 to the core network 114 (e.g., to a SON facilitator 332) using another SON message 848 (e.g., a SON message 520 of FIG. 5). This measurement data 654 can form a part of configuration information 512 (e.g., of FIGS. 5 and 9) that is provided to and collected by the SON facilitator 332 of the wireless network management node 122 (e.g., of FIG. 5). Alternately or additionally, the base station 104 can perform measurements, including with respect to the second wireless connection 312, and transmit the resulting measurement data to the SON facilitator 332 using another SON message 848.

Figure 9:
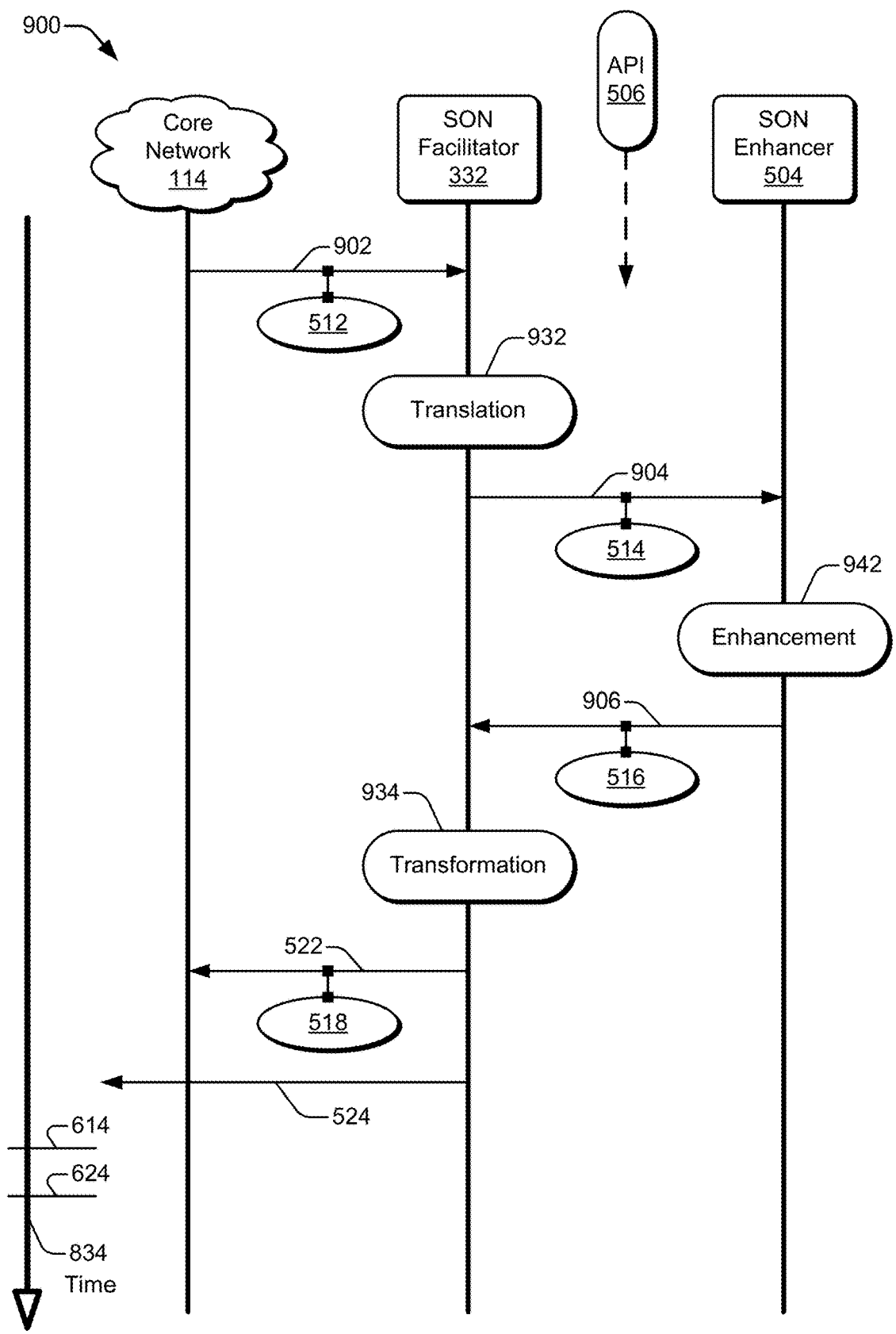
FIG. 9 is a sequence diagram illustrating examples of operations and communications between a SON facilitator of a wireless network management node (WNMN) and a SON enhancer of a network enhancement server in accordance with an application programming interface (API) instantiated by the SON facilitator.

FIG. 9 is a sequence diagram 900 illustrating examples of operations performed by, and communications exchanged between, a SON facilitator 332 of a wireless network management node 122 (e.g., of FIGS. 1, 3, and 5) and a SON enhancer 504 of a network enhancement server 124 (e.g., of FIGS. 1 and 5) in accordance with an application programming interface 506 (API 506) to facilitate SON enhancement in accordance with a wireless signaling protocol. Additional example communications are shown that also include the core network 114. Each of the communications depicted in FIG. 9 may be implemented as a SON message 520 (of FIG. 5): these include a message 902, a message 904, and a message 906. In the example sequence diagram 900, time 834 increases in the downward direction; the arrow for time 834 is not necessarily depicted to scale relative to the occurrences of the operations and communications.

In example implementations, the core network 114 sends configuration information 512 to the SON facilitator 332 using at least one message 902. Entities in the core network 114 that may contribute at least a portion of the configuration information 512 include management nodes, network elements, network functions, network slices, base stations coupled to the core network, combinations thereof, and so forth. Thus, the other SON message 848 (of FIG. 8) that carries the measurement data 654 may be, for instance, part of or an example instance of the message 902 carrying configuration information 512.

At 932, the SON facilitator 332 translates the configuration information 512, which is formatted for consumption, transmission, or usage by a wireless network, into a format that is appropriate for input to an enhancement mechanism, which formatted information is called translated configuration information 514 herein. For example, the SON facilitator 332 can convert configuration information received using one or more wireless network protocols into data that can be applied to an input layer of an AI-based enhancement mechanism, such as a neural network. The SON facilitator 332 provides the translated configuration information 514 to the SON enhancer 504 using at least one message 904 in accordance with the API 506.

The SON enhancer 504 processes the translated configuration information 514 to produce alternative configuration information 516 as part of an enhancement procedure at 942. In some cases, the enhancement procedure uses guided learning to incrementally improve performance of the wireless network based on feedback from an earlier experimental configuration that is included as part of the configuration information 512. However, a different enhancement procedure at 942 that utilizes a different, e.g., AI-based analysis mechanism can alternatively be performed. The SON enhancer 504 provides the alternative configuration information 516 to the SON facilitator 332 using at least one message 906 in accordance with the API 506. The alternative configuration information 516 includes different network parameters that are expected to improve network performance over the previous ones as represented by the configuration information 512 and the translated configuration information 514. These different network parameters can include different radio access or radio network parameters.

In this example, the alternative configuration information 516 comprises at least a portion of an output layer of a deep learning algorithm. However, the alternative configuration information 516 may be organized or formatted differently. The SON facilitator 332 performs a transformation procedure at 934 on the alternative configuration information 516 to produce transformed alternative configuration information 518. This transformed alternative configuration information 518 is organized or formatted for usage by, and communication among, various aspects of the wireless network. The SON facilitator 332 packages at least the parameter changes of the transformed alternative configuration information 518 into messages that can be transmitted over and interpreted by different network components. Thus, the SON facilitator 332 disseminates the parameter changes of the transformed alternative configuration information 518 using one or more SON network announcement messages 522 (of FIG. 5). These messages 522 are sent to network elements, various network functions, multiple slices, and so forth of the core network 114. Upon receipt of such messages, a base station can generate a DL SON message 524 for transmission to an affected UE. Alternatively, the SON facilitator 332 can generate a DL SON message 524 for routing and transmission to the affected UE prior to the begin time 614 as shown in FIG. 9.

Having generally described schemes and apparatuses for facilitating self-organizing network (SON) enhancement, this discussion now turns to example methods.

Example Methods

Example methods are described below with reference to various flow diagrams of FIGS. 10, 11, and 12. These methods relate to facilitating SON enhancement for a UE, a base station, and a network management node, respectively. Aspects of these methods may be implemented in, for example, hardware (e.g., fixed logic circuitry, a communication-oriented processor such as a modem, or a general-purpose processor in conjunction with a memory system), firmware, or some combination thereof. These techniques may be realized using one or more of the wireless devices or components shown in FIGS. 1-9, which devices or components may be further divided, combined, and so on. The electronic devices and components of these figures generally represent firmware, hardware—such as user or server devices, IC chips, circuits, or a combination thereof. Thus, these figures illustrate some of the many possible systems or apparatuses capable of implementing the described techniques.

For these flow diagrams, the orders in which operations are shown and/or described are not intended to be construed as a limitation. Any number or combination of the described method operations can be combined in any order to implement a given method, or an alternative method. Also, operations may be omitted or added to the described techniques. Further, described operations can be implemented in fully or partially overlapping manners. Although the three flowcharts are described separately, their operations may be interrelated. For example, if a UE 102 is described as transmitting an UL SON message 526 with a particular payload with respect to one flow diagram, a corresponding serving base station 104 can therefore be receiving the payload.

Figure 10:
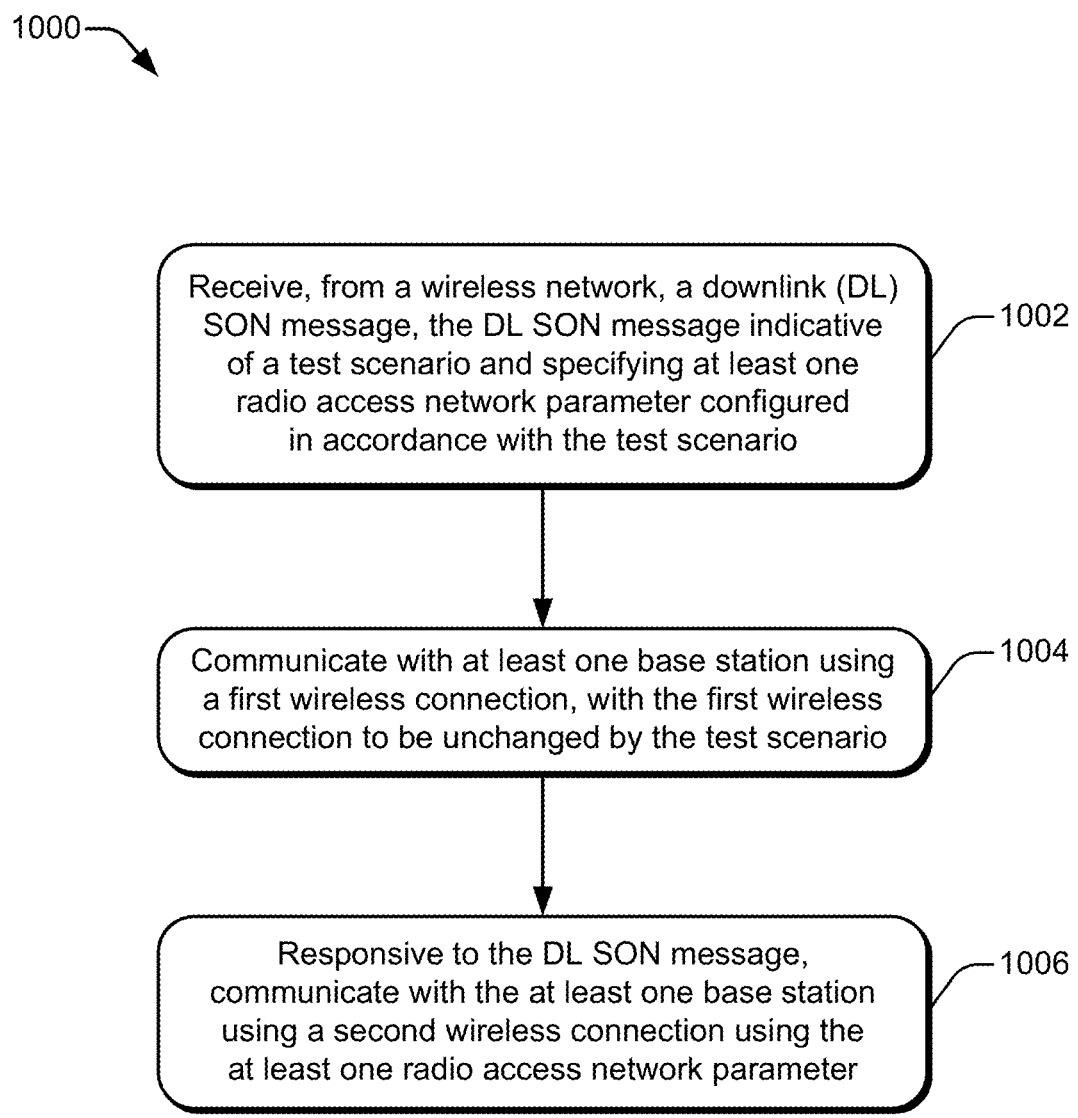
FIG. 10 illustrates example methods for a UE to facilitate SON enhancement.

FIG. 10 illustrates, with a flow diagram 1000, example methods for facilitating SON enhancement with a UE 102. In example implementations, the UE 102 is informed of an upcoming test scenario so that the UE 102 can safely participate in the test scenario and successfully maintain data throughput during execution of the test scenario. At 1002, a downlink (DL) SON message is received from a wireless network, with the DL SON message indicative of a test scenario and specifying at least one radio access network parameter configured in accordance with the test scenario. For example, the UE 102 can receive, from a wireless network 402, a DL SON message 524, with the DL SON message 524 indicative of a test scenario 502 and specifying at least one radio access network parameter 602 configured in accordance with the test scenario 502. The radio access network parameter 602 can be one for which the UE 102 affirmatively makes a change (e.g., to transceiver settings) to implement, one that the UE 102 can directly detect a change of but is realized at a serving base station, one that the UE 102 is or may be indirectly affected by, and so forth. A parameter 602 may generally comprise, for instance, a maximum transmit power level permitted by the UE 102 on a given carrier, a base station handover threshold, a network function or location thereof that is to be different, and so forth.

At 1004, at least one base station is communicated with using a first wireless connection, with the first wireless connection to be unchanged by the test scenario. For example, the UE 102 can communicate with a base station 104 using at least a first wireless connection 311, with the first wireless connection 311 to be unchanged by the test scenario 502. Here, the first wireless connection 311 can be unchanged by the test scenario 502 based on the first wireless connection 311 being established with one or more resources that are separate from those resources configured in accordance with the test scenario. For the two wireless connections to be used for communication during the testing scenario 502, the UE 102 may transmit or receive a signal to or from the base station 104 using both the first wireless connection 311 and a second wireless connection 312, which is described below, at least once during a timeframe 604 of a test scenario 502. The first wireless connection 311 may be allocated to radio access or core network resources (e.g., hardware, network functions, a network slice, air interface resources, some combination thereof) that are to be unaffected by the planned network configuration changes or differences implemented in accordance with the test scenario 502. In some aspects, the DL SON message 524 may indicate the extant connections 608 and identify which wireless connection is to be unchanged by the test scenario 502 and thus separate from (e.g., not subject to) the alternative configurations to be implemented in accordance with the test scenario 502. The UE 102 can therefore maintain at least one reliable (e.g., previously used successfully) wireless connection, the first wireless connection 311.

At 1006, at least one base station is communicated with using a second wireless connection using the at least one radio access network parameter. For example, responsive to the DL SON message 524, the UE 102 can participate in the test scenario 502 by communicating with the base station 104 using the second wireless connection 312 using the at least one radio access network parameter 602. Thus, the UE 102 may experience different network performance characteristics, while using the second wireless connection 312 during the test scenario 502 due to the one or more alternative radio access network parameters 602. These different network performance characteristics may be different as compared to those experienced with the first wireless connection 311, with a previous version of the second wireless connection 312, or another earlier wireless connection.

Figure 11:
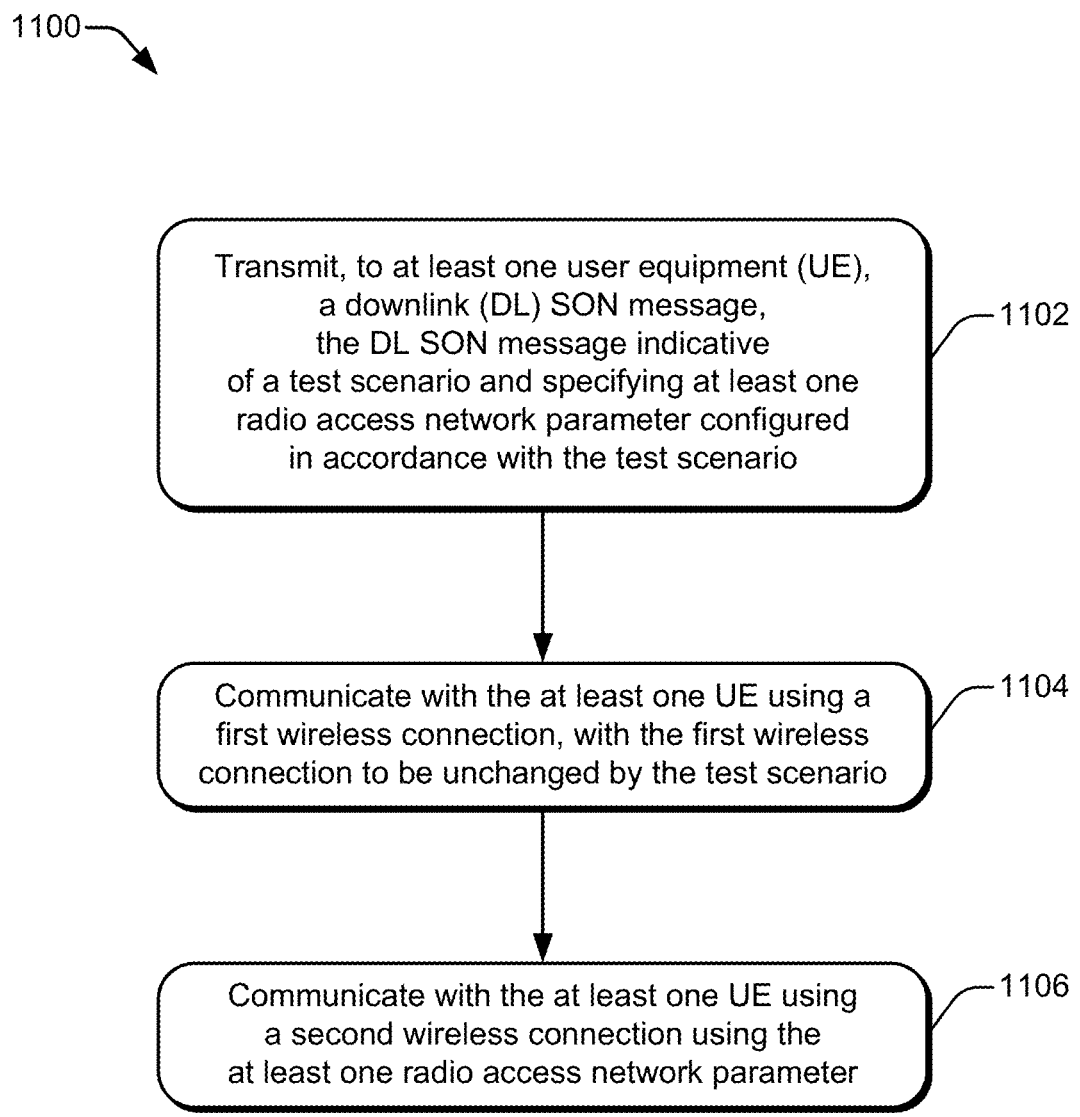
FIG. 11 illustrates example methods for a base station to facilitate SON enhancement.

FIG. 11 illustrates, with a flow diagram 1100, example methods for facilitating SON enhancement with a base station 104. In example implementations, the base station 104 informs a UE of an upcoming test scenario so that the UE can safely participate in the test scenario using multiple wireless connections, at least one of which has been used successfully before (e.g., successfully provided a given QoS or did not otherwise fail). At 1102, a downlink (DL) SON message is transmitted to at least one UE, with the DL SON message indicative of a test scenario and specifying at least one radio access network parameter configured in accordance with the test scenario. For example, the base station 104 can transmit to at least one UE 102 a DL SON message 524, with the DL SON message 524 indicative of a test scenario 502 and specifying at least one radio access network parameter 602 configured in accordance with the test scenario 502. The DL SON message 524 may also specify how the radio access network parameter 602 is to be configured for the test scenario 502 for a particular wireless connection or include other attributes of the test scenario 502 as described above with reference to FIG. 6.

At 1104, the at least one UE is communicated with using a first wireless connection, with the first wireless connection to be unchanged by the test scenario. For example, the base station 104 can communicate with the at least one UE 102 using at least a first wireless connection 311, with the first wireless connection 311 to be unchanged by the test scenario 502. The first wireless connection 311 may be able to provide a corresponding QoS 350 that is associated with the at least one UE 102 by separating the first wireless connection 311 from changes scheduled for implementation during the test scenario 502 (e.g., by allocating the first wireless connection 311 to resources of an unaffected slice 450 of a radio access or core network).

At 1106, the at least one UE is communicated with using a second wireless connection using the at least one radio access network parameter. For example, based on the DL SON message 524, the base station 104 can communicate with the at least one UE 102 using the second wireless connection 312 using the at least one radio access network parameter 602. For instance, the base station 104 may communicate with the at least one UE 102 using the second wireless connection 312 while the second wireless connection 312 has a different level of performance or at least different characteristics because of the alternative configuration implemented by the specified radio access network parameter 602. Here, the first wireless connection 311 is independent of the second wireless connection 312 such that the first wireless connection 311 can continue to provide connectivity to the at least one UE 102 even if the second wireless connection 312 fails as a result of the specified radio access network parameter 602 or another aspect of the test scenario 502 being executed.

Figure 12:
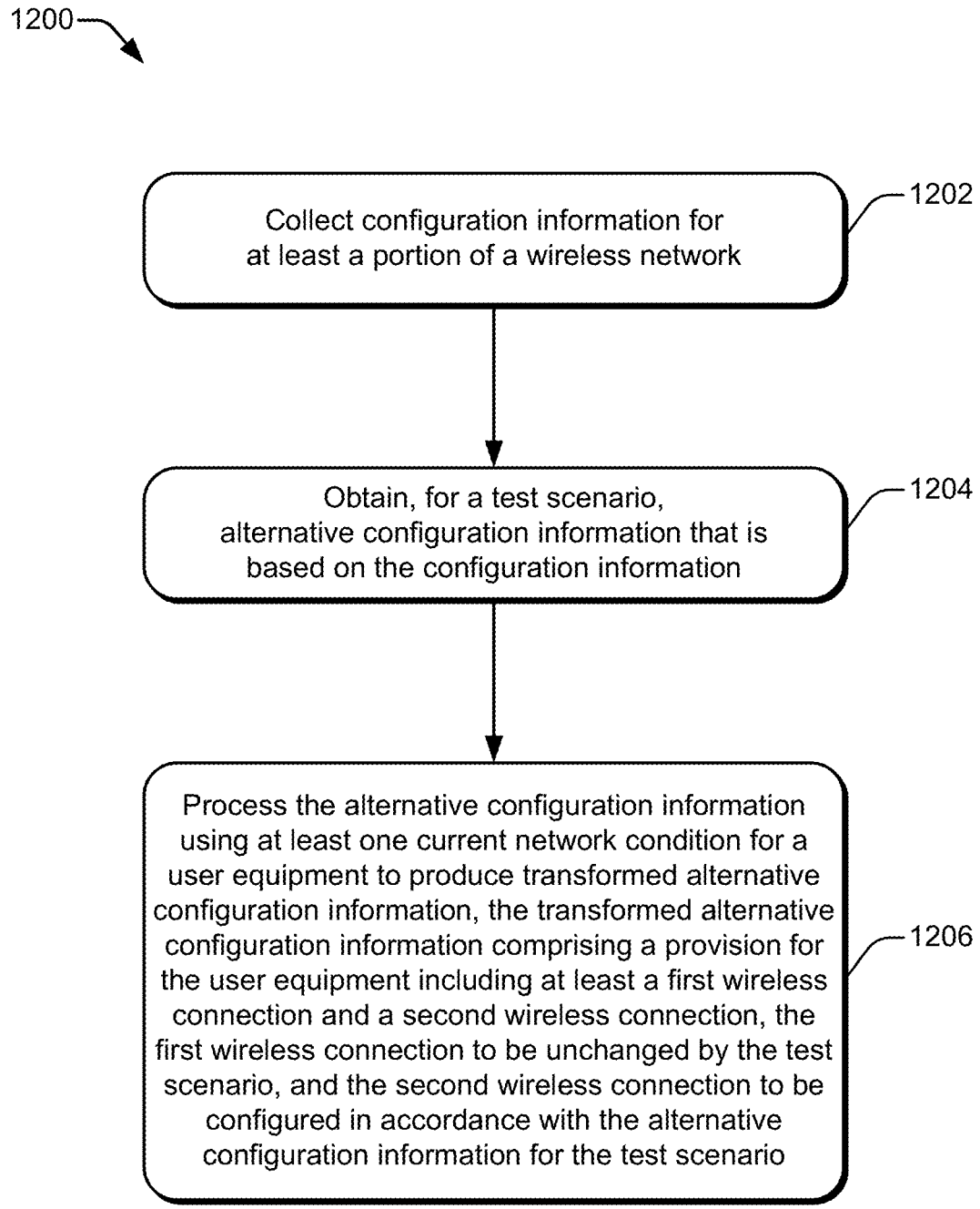
FIG. 12 illustrates example methods for a wireless network management node to facilitate SON enhancement.

FIG. 12 illustrates, with a flow diagram 1200, example methods for facilitating SON enhancement with a SON facilitator 332 of a wireless network management node 122. In example implementations, the SON facilitator 332 directs a wireless network to undergo a testing scenario as an experimental round intended to gradually discover iterative network performance improvements using a guided scheme. At 1202, configuration information is collected for at least a portion of a wireless network. For example, a SON facilitator 332 can collect configuration information 512 for at least a portion of a wireless network 402. The SON facilitator 332 may collect current network configuration information, such as current parameter settings, from other control or management nodes, from nodes or functions of the core network 114, from base stations 104, from UEs 102, and so forth using SON messages 520. As part of the configuration information 512, the SON facilitator 332 may also collect data measured by network entities as the data existed in a previous test scenario 502.

At 1204, alternative configuration information is obtained for a test scenario, with the alternative configuration information based on the configuration information. For example, the SON facilitator 332 can obtain, for a test scenario 502, alternative configuration information 516 that is based on the configuration information 512 being processed by a self-organizing network (SON) enhancer 504. The SON facilitator 332 and the SON enhancer 504 can be located at a same node or different nodes, can be operated by a same entity or different entities, can be distributed across a same server or different servers, and so forth. The SON enhancer 504 may, for instance, be realized using an AI algorithm (e.g., machine learning or iterative refinement). If so, the SON enhancer 504 can produce the alternative configuration information 516 by applying translated configuration information 514, which is derived from the configuration information 512 by the SON facilitator 332, to a neural network with reinforcement learning. In some aspects, the SON facilitator 332 may translate the configuration information 512 from a format that is compatible with operating a wireless network into a format that is compatible for inputting into an AI mechanism, such as the neural network, to produce the translated configuration information 514. Interaction between the SON facilitator 332 and the SON enhancer 504 can be realized using an API 506, which can be instantiated by the SON facilitator 332.

At 1206, the alternative configuration information is processed using at least one current network condition for a user equipment to produce transformed alternative configuration information, with the transformed alternative configuration information comprising a provision for the user equipment including at least a first wireless connection and a second wireless connection. The first wireless connection is to be unchanged by the test scenario, and the second wireless connection is to be configured in accordance with the alternative configuration information for the test scenario. For example, the SON facilitator 332 can process the alternative configuration information 516 using at least one current network condition (e.g., a current geospatial location, a current serving base station, a current radio access parameter, a current QoS, or current network functions interacting with the UE) for a UE 102 to produce transformed alternative configuration information 518. The transformed alternative configuration information 518 comprises a provision for the UE 102 including at least a first wireless connection 311 and a second wireless connection 312. The first wireless connection 311 is to be unchanged by the test scenario 502, and the second wireless connection 312 is to be configured in accordance with the alternative configuration information 516 for the test scenario 502.

To do so, the SON facilitator 332 may transform the alternative configuration information 516 from a format corresponding to output from the AI mechanism into a format compatible with at least one wireless network protocol. Alternately or additionally, communication resources, such as radio access or core network resources, may be provisioned for the UE 102 by the SON facilitator 332 based on a current network condition (e.g., a QoS 350 that is currently contractually due to, or otherwise associated with, the UE 102) such that the UE 102 is assigned two wireless connections. Further, multiple wireless connections may be assigned to those UEs that do not have a particular QoS currently to ensure reliability, or multiple wireless connections may be assigned to those UEs that are determined to have a greater likelihood of losing service quality due to the parameter changes planned for the test scenario 502. In some aspects, the first wireless connection 311 can be unchanged by a test scenario 502 by being provisioned substantially separately from radio access network parameters configured in accordance with the test scenario 502. Further, the first wireless connection 311 can be provisioned substantially separately from the radio access network parameters configured in accordance with the test scenario 502 by being assigned radio access or core network resources for the first wireless connection 311 that persist through a failure of other radio access or core network resources, such as those that are configured in accordance with the test scenario 502 (e.g., for the second wireless connection 312).

Additional Examples

In the following, some examples are described.

Example 1: A user equipment comprising: at least one antenna; at least one wireless transceiver coupled to the at least one antenna; and a processor and memory system, coupled to the at least one wireless transceiver, implementing a self-organizing network (SON) facilitator configured to: receive, from a wireless network, a downlink (DL) SON message, the DL SON message indicative of a test scenario and specifying at least one radio access network parameter configured in accordance with the test scenario; and instruct the at least one wireless transceiver to communicate with at least one base station using at least a first wireless connection and a second wireless connection, the first wireless connection to be unchanged by the test scenario, and the second wireless connection to use the at least one radio access network parameter.

Example 2: The user equipment of example 1, wherein the SON facilitator is further configured to: instruct the at least one wireless transceiver to maintain the first wireless connection during an execution of the test scenario to provide a quality-of-service (QoS) that is associated with the user equipment.

Example 3: The user equipment of example 1 or 2, wherein the SON facilitator is further configured to: instruct the at least one wireless transceiver to communicate using the second wireless connection during at least a portion of the execution of the test scenario in which the second wireless connection is configured in accordance with the at least one radio access network parameter.

Example 4: The user equipment of any one of examples 1 to 3, wherein: the DL SON message indicates a timeframe for an execution of the test scenario, the timeframe including at least an end time; and the SON facilitator is further configured to terminate the execution of the test scenario responsive to the end time.

Example 5: The user equipment of any one of examples 1 to 4, wherein the SON facilitator is further configured to: generate an uplink (UL) SON message responsive to the DL SON message, the UL SON message acknowledging participation in the test scenario; and instruct the at least one wireless transceiver to transmit the UL SON message to the at least one base station or another base station of the wireless network.

Example 6: The user equipment of example 5, wherein the UL SON message comprises a first UL SON message; and the SON facilitator is further configured to: generate a second UL SON message responsive to the participation in the test scenario, the second UL SON message including measurement data related to the test scenario; and instruct the at least one wireless transceiver to transmit the second UL SON message to the at least one base station or the other base station of the wireless network. Alternatively, an UL SON message including measurement data related to the test scenario can be generated and transmitted to a base station without first transmitting an UL SON message that acknowledges participation in the test scenario.

Example 7: The user equipment of any one of examples 1 to 6, wherein the SON facilitator is further configured to: receive the DL SON message from the at least one base station or another base station of the wireless network using at least one of: a broadcast message; a media access control (MAC) control element (CE); or an over-the-top message.

Example 8: The user equipment of any one of examples 1 to 7, wherein: the DL SON message indicates a termination configuration for termination of an execution of the test scenario; and the SON facilitator is further configured to instruct the at least one wireless transceiver to communicate with the wireless network using the termination configuration responsive to the termination of the execution of the test scenario.

Example 9: The user equipment of example 8, wherein: the termination configuration comprises a reversion indication; and the SON facilitator is further configured to instruct the at least one wireless transceiver to revert to a previous configuration, which was in effect prior to the execution of the test scenario, in accordance with the reversion indication and responsive to the termination of the execution of the test scenario.

Example 10: The user equipment of example 8, wherein: the termination configuration comprises a different configuration that is at least partially specified by the DL SON message; and the SON facilitator is further configured to instruct the at least one wireless transceiver to switch to the different configuration responsive to the termination of the execution of the test scenario.

Example 11: The user equipment of any one of examples 1 to 10, wherein the at least one wireless transceiver comprises at least two wireless transceivers.

Example 12: The user equipment of any one of examples 1 to 11, wherein the first wireless connection is to be unchanged by the test scenario by being provisioned substantially separately from radio access network parameters configured in accordance with the test scenario.

Example 13: The user equipment of example 12, wherein the first wireless connection is to be provisioned substantially separately from the radio access network parameters configured in accordance with the test scenario by being assigned radio access or core network resources for the first wireless connection that persist through a failure of other radio access or core network resources that are configured in accordance with the test scenario.

Example 14: The user equipment of any one of examples 1 to 13, wherein the first wireless connection is to be unchanged by the test scenario by being provided a quality-of-service (QoS) using at least one slice of the wireless network that is configured to maintain the QoS even if another slice of the wireless network that is configured in accordance with the test scenario is degraded responsive to an execution of the test scenario.

Example 15: The user equipment of any one of examples 1 to 14, wherein the first wireless connection is unchanged by the test scenario from a known wireless connection configuration.

Example 16: The user equipment of example 15, wherein the known wireless connection configuration comprises at least one of: a wireless connection configuration that has been previously used successfully; a wireless connection configuration that is in use prior to starting an execution of the test scenario; or a wireless connection configuration that corresponds to a quality-of-service (QoS) that is associated with the user equipment.

Example 17: The user equipment of any one of examples 1 to 16, wherein the first wireless connection is to be unchanged by the test scenario based on the first wireless connection being established with one or more resources that are separate from resources configured in accordance with the test scenario.

Example 18: The user equipment of any one of examples 1 to 17, wherein the first wireless connection is independent of the second wireless connection such that the first wireless connection can continue to provide connectivity to the user equipment even if the second wireless connection fails.

Example 19: A base station comprising: multiple antennas; multiple wireless transceivers coupled to the multiple antennas; and a processor and memory system, coupled to the multiple wireless transceivers, implementing a self-organizing network (SON) facilitator configured to: transmit, to at least one user equipment, a downlink (DL) SON message, the DL SON message indicative of a test scenario and specifying at least one radio access network parameter configured in accordance with the test scenario; and instruct at least one wireless transceiver of the multiple wireless transceivers to communicate with the at least one user equipment using at least a first wireless connection and a second wireless connection, the first wireless connection to be unchanged by the test scenario, and the second wireless connection to use the at least one radio access network parameter.

Example 20: A method for a user equipment comprising: receiving, from a wireless network, a downlink (DL) SON message, the DL SON message indicative of a test scenario and specifying at least one radio access network parameter configured in accordance with the test scenario; communicating, using at least one wireless transceiver, with at least one base station using a first wireless connection, the first wireless connection to be unchanged by the test scenario; and communicating with the at least one base station using a second wireless connection that uses the at least one radio access network parameter.

Example 21: A method for a base station comprising: transmitting, to at least one user equipment, a downlink (DL) SON message, the DL SON message indicative of a test scenario and specifying at least one radio access network parameter configured in accordance with the test scenario; communicating, using one or more wireless transceivers, with the at least one user equipment using a first wireless connection, the first wireless connection to be unchanged by the test scenario; and communicating with the at least one user equipment using a second wireless connection that uses the at least one radio access network parameter.

Example 22: The method of example 21, wherein: the DL SON message indicates a timeframe for the test scenario, the timeframe including a begin time and an end time; and the communicating with the at least one user equipment using the second wireless connection comprises: starting a communication using the second wireless connection responsive to the begin time; and terminating the communication using the second wireless connection responsive to the end time.

Example 23: The method of example 21 or 22, wherein: the DL SON message indicates a termination configuration for termination of an execution of the test scenario; and the method further comprises, responsive to the termination of the execution of the test scenario, communicating with the at least one user equipment using a third wireless connection that is configured in accordance with the termination configuration.

Example 24: The method of example 23, wherein: the DL SON message indicates a timeframe for the test scenario, the timeframe including an end time; the termination configuration comprises a reversion indication or a different configuration that includes at least part of a configuration specification; and the method further comprises at least one of: responsive to the end time, implementing the third wireless connection by reverting to a configuration that existed prior to starting the execution of the test scenario based on the termination configuration comprising the reversion indication; or responsive to the end time, implementing the third wireless connection by switching to the different configuration in accordance with the configuration specification based on the termination configuration comprising the different configuration.

Example 25: The method of any one of examples 21 to 24, further comprising: receiving, from the at least one user equipment, an uplink (UL) SON message, the UL SON message including measurement data relating to the second wireless connection during at least a portion of an execution of the test scenario; and transmitting, to a SON network function (NF) (SON NF), the measurement data.

Example 26: The method of any one of examples 21 to 25, wherein the communicating with the at least one user equipment using the first wireless connection comprises: maintaining the first wireless connection at a given quality-of-service (QoS) during an execution of the test scenario while the at least one radio access network parameter of the second wireless connection is configured in accordance with the test scenario.

Example 27: A system comprising: at least one core network interface coupled to a core network of a wireless network; and a processor and memory system, coupled to the at least one core network interface to communicate with the wireless network, implementing a self-organizing network (SON) facilitator configured to: collect configuration information for at least a portion of the wireless network; obtain, for a test scenario, alternative configuration information that is based on the configuration information; and process the alternative configuration information using at least one current network condition for a user equipment to produce transformed alternative configuration information, the transformed alternative configuration information comprising a provision for the user equipment including at least a first wireless connection and a second wireless connection, the first wireless connection to be unchanged by the test scenario, and the second wireless connection to be configured in accordance with the alternative configuration information for the test scenario.

Example 28: The system of example 27, wherein: the configuration information is processed by a SON enhancer; the SON enhancer is configured to use an artificial intelligence (AI) mechanism to produce the alternative configuration information based on the configuration information; and the SON facilitator is further configured to obtain the alternative configuration information by: providing the configuration information to the SON enhancer; and accepting the alternative configuration information from the SON enhancer.

Example 29: The system of example 28, wherein the SON facilitator is further configured to: expose an application programming interface (API) to the SON enhancer, the API configured to: translate the configuration information into a format corresponding to input for the AI mechanism; and transform the alternative configuration information from a format corresponding to output from the AI mechanism into a format compatible with at least one wireless network protocol.

Example 30: The system of any one of examples 27 to 29, wherein the SON facilitator is further configured to: transmit, to one or more network function entities of the wireless network, a network announcement message regarding the test scenario based on the transformed alternative configuration information, the network announcement message including: a specified at least one radio access network parameter for the test scenario; a timeframe for an execution of the test scenario; and a termination configuration to be enacted responsive to termination of the execution of the test scenario.

Example 31: The system of any one of examples 27 to 30, wherein: the system is operated by a first network operator, and the SON facilitator comprises a first SON facilitator; and the first SON facilitator is further configured to send, using a SON proxy, a notification to a second SON facilitator corresponding to a second network operator, the notification indicative of at least one aspect of the test scenario.

Example 32: The system of any one of examples 27 to 31, wherein the alternative configuration information indicates at least one radio access network parameter for the second wireless connection.

Example 33: A method for facilitating self-organizing network, SON, enhancement in a wireless network, the method comprising a user equipment: receiving, from the wireless network, a downlink, DL, SON message, the DL SON message indicative of a test scenario and specifying at least one radio access network parameter configured in accordance with the test scenario; and communicating with at least one base station using at least a first wireless connection and a second wireless connection that are simultaneously extant during at least a portion of an execution of the test scenario, the first wireless connection to be unchanged by the test scenario, and the second wireless connection to use the at least one radio access network parameter.

Example 34: The method of example 33, further comprising: maintaining the first wireless connection during the execution of the test scenario to provide a quality-of-service, QoS, that is associated with the user equipment.

Example 35: The method of example 33 or 34, wherein the communicating comprises: communicating with a single base station using at least the first wireless connection and the second wireless connection that are simultaneously extant during at least the portion of the execution of the test scenario.

Example 36: The method of any one of examples 33 to 35, wherein: the DL SON message indicates a timeframe for the execution of the test scenario, the timeframe including at least an end time; and the method further comprises terminating participation in the execution of the test scenario responsive to the end time.

Example 37: The method of any one of examples 33 to 36, further comprising: generating an uplink, UL, SON message responsive to the DL SON message, the UL SON message acknowledging participation in the test scenario; and transmitting the UL SON message to the at least one base station or a second base station of the wireless network.

Example 38: The method of example 37, wherein: the UL SON message comprises a first UL SON message; and the method further comprises: generating a second UL SON message responsive to the participation in the test scenario, the second UL SON message including measurement data related to the test scenario; and transmitting the second UL SON message to the at least one base station or the second base station of the wireless network.

Example 39: The method of any one of examples 33 to 38, wherein: the DL SON message indicates a termination configuration for termination of the execution of the test scenario; and the method further comprises communicating with the wireless network using the termination configuration responsive to the termination of the execution of the test scenario.

Example 40: The method of example 39, wherein: the termination configuration comprises a reversion indication; and the method further comprises reverting to a previous configuration that was in effect prior to the execution of the test scenario, in accordance with the reversion indication and responsive to the termination of the execution of the test scenario.

Example 41: The method of example 39, wherein: the termination configuration comprises a different configuration that is at least partially specified by the DL SON message; and the method further comprises switching to the different configuration responsive to the termination of the execution of the test scenario.

Example 42: The method of any one of examples 33 to 41, wherein the first wireless connection is to be unchanged by the test scenario by being provided a quality-of-service, QoS, using at least one slice of the wireless network that is configured to maintain the QoS even if another slice of the wireless network that is configured in accordance with the test scenario is degraded responsive to the execution of the test scenario.

Example 43: The method of any one of examples 33 to 42, wherein the first wireless connection is to be unchanged by the test scenario based on the first wireless connection being established with one or more air interface resources that are separate from air interface resources configured in accordance with the test scenario.

Example 44: The method of any one of examples 33 to 43, wherein the first wireless connection is to be unchanged by the test scenario by being provisioned substantially separately from radio access network parameters configured in accordance with the test scenario.

Example 45: A user equipment comprising: at least one wireless transceiver; and a processor and memory system coupled to the at least one wireless transceiver and configured to perform the method of any one of examples 33 to 44.

Example 46: A method for facilitating self-organizing network, SON, enhancement in a wireless network, the method comprising at least one base station: transmitting, to at least one user equipment, a downlink, DL, SON message, the DL SON message indicative of a test scenario and specifying at least one radio access network parameter configured in accordance with the test scenario; and communicating with the at least one user equipment using at least a first wireless connection and a second wireless connection that are simultaneously extant during at least a portion of an execution of the test scenario, the first wireless connection to be unchanged by the test scenario, and the second wireless connection to use the at least one radio access network parameter.

Example 47: The method of example 46, wherein: the DL SON message indicates a timeframe for the test scenario, the timeframe including a begin time and an end time; and the communicating with the at least one user equipment comprises: starting use of the second wireless connection responsive to the begin time; and terminating use of the second wireless connection responsive to the end time.

Example 48: The method of example 46 or 47, further comprising: receiving, from the at least one user equipment, an uplink, UL, SON message, the UL SON message including measurement data relating to the second wireless connection during at least the portion of the execution of the test scenario; and transmitting the measurement data to a SON network function.

Example 49: The method of any one of examples 46 to 48, wherein the communicating comprises: maintaining the first wireless connection at a given quality-of-service, QoS, during the execution of the test scenario while the at least one radio access network parameter of the second wireless connection is configured in accordance with the test scenario.

Example 50: The method of any one of examples 46 to 49, further comprising: receiving, from a SON network function, at least one network announcement message regarding the test scenario, the at least one network announcement message including the at least one radio access network parameter that is specified to be configured in accordance with the test scenario.

Example 51: At least one base station comprising: at least one wireless transceiver; and a processor and memory system coupled to the at least one wireless transceiver and configured to perform the method of any one of examples 46 to 50.

The above-described examples may be combined in different manners. For example, the features corresponding to user equipment implementations may be incorporated into methods performed by a user equipment, and vice versa. For instance, the method of example 20 may include operations corresponding to any of the features of examples 1 to 19. Also, the methods of examples 33 to 44 may include operations corresponding to any of the features of examples 1 to 19. Similarly, the features corresponding to base station implementations may be incorporated into methods performed by a base station, and vice versa. For instance, the base station of example 19 may be further configured to perform the method of any of examples 21 to 26 or examples 46 to 50. Further, the method by a base station of example 20 may be combined with the method of any of examples 21 to 26 or examples 46 to 50, and the acts of the method of any of examples 21 to 26 can be combined with those of examples 46 to 50. Additionally, the features corresponding to a system of examples 27 to 32 can be implemented as a method performed by a system. The present disclosure may also provide a computer-readable medium having instructions stored thereon, wherein execution of the instructions causes a device to perform any of the methods or processes disclosed herein, including the examples set forth above.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for facilitating self-organizing network (SON) enhancement have been described in language specific to certain features and/or methods, the subject of the appended claims is not necessarily limited to the specific features or methods described. Rather, the specific features and methods are disclosed as example implementations for facilitating SON enhancement.

What is claimed is:

1. A method performed by a user equipment to facilitate self-organizing network (SON) enhancement in a wireless network, the method comprising:
receiving, from the wireless network, a downlink SON message, the downlink SON message indicative of a test scenario and specifying at least one radio access network parameter configured in accordance with the test scenario; and
communicating user data with at least one base station using at least a first wireless connection and a second wireless connection that are simultaneously extant during at least a portion of an execution of the test scenario, the first wireless connection to be unchanged by the test scenario, and the second wireless connection to use the at least one radio access network parameter.

2. The method of claim 1, further comprising:
maintaining the first wireless connection during the execution of the test scenario to provide a quality-of-service (QoS) that is associated with the user equipment.

3. The method of claim 1, wherein the communicating comprises:
communicating with a single base station using at least the first wireless connection and the second wireless connection that are simultaneously extant during at least the portion of the execution of the test scenario.

4. The method of claim 1, wherein:
the downlink SON message indicates a timeframe for the execution of the test scenario, the timeframe including at least an end time; and
the method further comprises terminating participation in the execution of the test scenario responsive to the end time.

5. The method of claim 1, further comprising:
generating an uplink SON message responsive to the downlink SON message, the uplink SON message acknowledging participation in the test scenario; and
transmitting the uplink SON message to the at least one base station or a second base station of the wireless network.

6. The method of claim 5, wherein:
the uplink SON message comprises a first uplink SON message; and
the method further comprises:
generating a second uplink SON message responsive to the participation in the test scenario, the second uplink SON message including measurement data related to the test scenario; and
transmitting the second uplink SON message to the at least one base station or the second base station of the wireless network.

7. The method of claim 1, wherein:
the downlink SON message indicates a termination configuration for termination of the execution of the test scenario; and
the method further comprises communicating with the wireless network using the termination configuration responsive to the termination of the execution of the test scenario.

8. The method of claim 7, wherein:
the termination configuration comprises a reversion indication; and
the method further comprises reverting to a previous configuration that was in effect prior to the execution of the test scenario, in accordance with the reversion indication and responsive to the termination of the execution of the test scenario.

9. The method of claim 7, wherein:
the termination configuration comprises a different configuration that is at least partially specified by the downlink SON message; and
the method further comprises switching to the different configuration responsive to the termination of the execution of the test scenario.

10. The method of claim 1, wherein the first wireless connection is to be unchanged by the test scenario by being provided a quality-of-service (QoS) using at least one slice of the wireless network that is configured to maintain the QoS even if another slice of the wireless network that is configured in accordance with the test scenario is degraded responsive to the execution of the test scenario.

11. The method of claim 1, wherein the first wireless connection is to be unchanged by the test scenario based on the first wireless connection being established with one or more air interface resources that are separate from air interface resources configured in accordance with the test scenario.

12. The method of claim 1, wherein the first wireless connection functions as a fallback for communication by the user equipment if the second wireless connection is degraded responsive to the execution of the test scenario.

13. A method performed by at least one base station to facilitate self-organizing network (SON) enhancement in a wireless network, the method comprising:
   transmitting, to at least one user equipment, a downlink SON message, the downlink SON message indicative of a test scenario and specifying at least one radio access network parameter configured in accordance with the test scenario; and
   communicating user data with the at least one user equipment using at least a first wireless connection and a second wireless connection that are simultaneously extant during at least a portion of an execution of the test scenario, the first wireless connection to be unchanged by the test scenario, and the second wireless connection to use the at least one radio access network parameter.

14. The method of claim 13, wherein:
   the downlink SON message indicates a timeframe for the test scenario, the timeframe including a begin time and an end time; and
   the communicating with the at least one user equipment comprises:
      starting use of the second wireless connection responsive to the begin time; and
      terminating use of the second wireless connection responsive to the end time.

15. The method of claim 13, further comprising:
   receiving, from the at least one user equipment, an uplink SON message, the uplink SON message including measurement data relating to the second wireless connection during at least the portion of the execution of the test scenario; and
   transmitting the measurement data to a SON network function.

16. The method of claim 13, wherein the communicating comprises:
   maintaining the first wireless connection at a given quality-of-service (QoS) during the execution of the test scenario while the at least one radio access network parameter of the second wireless connection is configured in accordance with the test scenario.

17. The method of claim 13, further comprising:
   receiving, from a SON network function, at least one network announcement message regarding the test scenario, the at least one network announcement message including the at least one radio access network parameter that is specified to be configured in accordance with the test scenario.

18. A user equipment comprising:
   at least one wireless transceiver; and
   a processor and memory system configured to use the at least one wireless transceiver to implement a self-organizing network (SON) facilitator configured to:
      receive, from a wireless network, a downlink SON message, the downlink SON message indicative of a test scenario and specifying at least one radio access network parameter configured in accordance with the test scenario; and
      communicate user data with at least one base station using at least a first wireless connection and a second wireless connection that are simultaneously extant during at least a portion of an execution of the test scenario, the first wireless connection to be unchanged by the test scenario, and the second wireless connection to use the at least one radio access network parameter.

19. The user equipment of claim 18, wherein the SON facilitator is further configured to:
   maintain the first wireless connection during the execution of the test scenario to provide a quality-of-service (QoS) that is associated with the user equipment.

20. The user equipment of claim 18, wherein the SON facilitator is further configured to:
   generate an uplink SON message responsive to participation in the test scenario, the uplink SON message including measurement data related to the test scenario; and
   transmit the uplink SON message to the at least one base station or a second base station of the wireless network.

* * * * *